(12) United States Patent
Bourgoin et al.

(10) Patent No.: US 7,692,666 B1
(45) Date of Patent: Apr. 6, 2010

(54) CONSTRUCTING COLOR PROFILE FOR PARAMETERIZED IMAGE COLOR SPACE

(75) Inventors: Michael Bourgoin, Lake Forest Park, WA (US); Lars U. Borg, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1692 days.

(21) Appl. No.: 10/821,164

(22) Filed: Apr. 7, 2004

(51) Int. Cl.
  *G09G 5/02* (2006.01)
  *H04N 9/73* (2006.01)
  *G06K 9/00* (2006.01)

(52) U.S. Cl. .................. 345/601; 345/589; 345/591; 348/223.1; 382/162

(58) Field of Classification Search .............. 345/426, 345/589, 591, 601, 604; 358/516; 382/162; 348/223.1
See application file for complete search history.

(56) References Cited

U.S. PATENT DOCUMENTS

| 5,754,448 | A  | * | 5/1998  | Edge et al. ............. | 358/516 |
| 6,462,748 | B1 | * | 10/2002 | Fushiki et al. .......... | 345/604 |
| 2002/0031256 | A1 | * | 3/2002 | Hiramatsu et al. ........ | 382/162 |
| 2002/0083859 | A1 | * | 7/2002 | Hauck et al. ............ | 101/484 |
| 2003/0142222 | A1 | * | 7/2003 | Hordley ................. | 348/223.1 |

OTHER PUBLICATIONS

Ward et al., "Picture Perfect RGB Rendering Using Spectral Prefiltering and Sharp Color Primaries", 2002, Thirteenth Eurographics Workshop on Rendering, pp. 117-124 and 324.*
Matkovic et al., "Visual Image Query", 2002, ACM, pp. 116-123.*
Bergner et al., "Interactive Spectral Volume Rendering", IEEE Visualization 2002.*
Turkowski, "Anti-Aliasing in Topological Color Spaces", 1986, ACM, pp. 307-314.*
"David Bourgin's Color Spaces FAQ", http://www.scarse.org/docs/color_faq.html.
Norman Koren, "Color Management and Color Science: Introduction", http://www.normankoren.com/color_management.html.
Normal Koren, "Color Management: Implementation part 1: Setup, working color space, anatomy of a profile", http://www.normankoren.com/color_management_2.html.
Norman Koren, "Color Management: Implementation part 2: Monitor profiling, workflow details", http://www.normankoren.com/color_management_2A.html.

(Continued)

*Primary Examiner*—Almis R. Jankus
*Assistant Examiner*—Aaron M Guertin
(74) *Attorney, Agent, or Firm*—Fish & Richardson P.C.

(57) ABSTRACT

Systems and techniques support color management of an image with a parameterized image color space. In general, in one implementation, a color profile that conforms to a defined color profile architecture and that defines a multistage color space transform is generated. The image includes a parameterized encoding of an image color space with image parameters defining a range and an offset of an image component of the image, and a white point of the image color space. Generation of the color profile involves affecting two or more stages of the multistage transform based on the image parameters. Image processing precision can be increased by fitting output to input data scopes between two or more stages. The image parameters of the parameterized encoding can define ranges, offsets, and bit depths of image components of the image, and the color profile can be a bit-depth independent color profile.

48 Claims, 4 Drawing Sheets

OTHER PUBLICATIONS

Norman Koren, "Color Management: Obtaining ICC profiles and building them with MonocoEZcolor", http://normankoren.com/color_management_3.html.

Normal Koren, "Color Management: Evaluating color in printers and ICC profiles", http://normankoren.com/color_management_4.html.

"JP2 file format syntax", ISO/IEC FDIS15444-1:2000 (with Draft Corrigendum 1, Mar. 9, 2001), ITU-T Rec. T.800 (2000), pp. 145-148, 161-163 and 200-206.

"JPX extended file format syntax", ISO/IEC FDIS15444-2: 2001 (Aug. 8, 2001), ITU-T Rec. T.801(2001), pp. 169-172, 193-194 and 216-227.

"Specification ICC.1:2003-09, File Format for Color Profiles (Version 4.1.0)", International Color Consortium, 2003.

"Specification ICC.1:2001-12, File Format for Color Profiles (Version 4.0.0)", International Color Consortium, 2002.

"YCC color space" http://www.automatic-mail.com/colorite/yccspace.html.

* cited by examiner

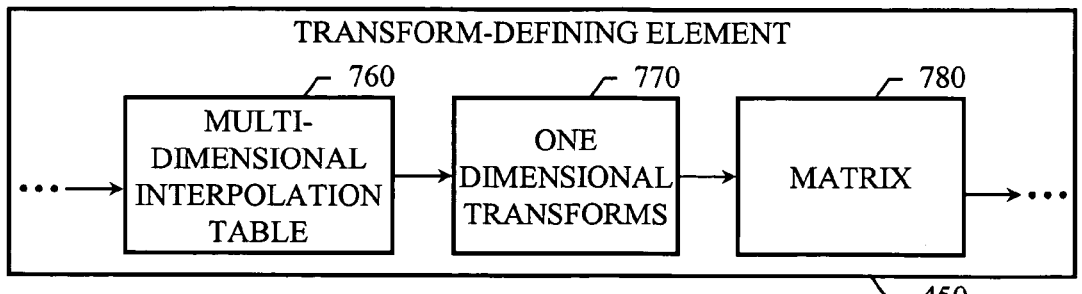

FIG. 7

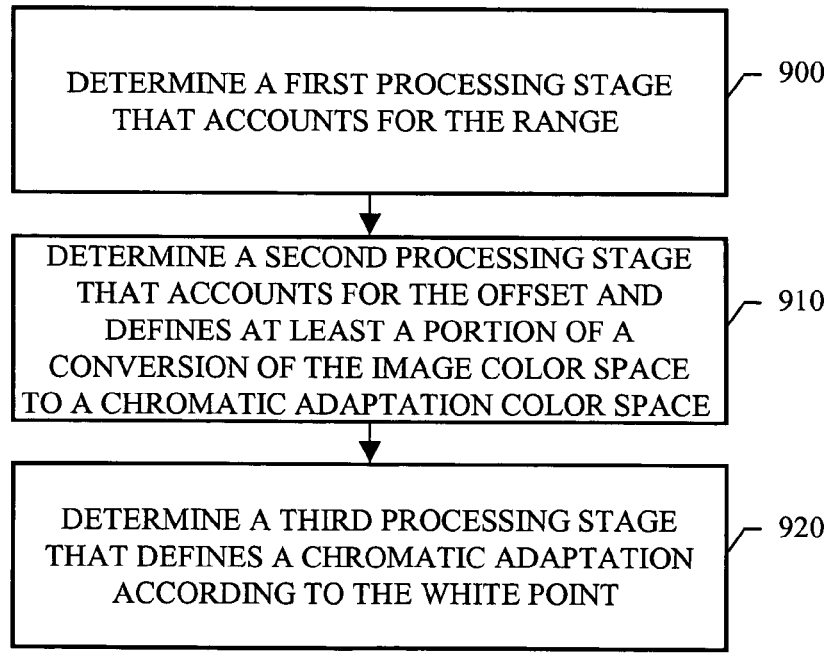

FIG. 8

```
┌─────────────────────────────────────────┐
│   DETERMINE A FIRST PROCESSING STAGE    │── 900
│       THAT ACCOUNTS FOR THE RANGE       │
└─────────────────────────────────────────┘
                    │
                    ▼
┌─────────────────────────────────────────┐
│   DETERMINE A SECOND PROCESSING STAGE   │
│  THAT ACCOUNTS FOR THE OFFSET AND       │
│  DEFINES AT LEAST A PORTION OF A        │── 910
│  CONVERSION OF THE IMAGE COLOR SPACE    │
│  TO A CHROMATIC ADAPTATION COLOR SPACE  │
└─────────────────────────────────────────┘
                    │
                    ▼
┌─────────────────────────────────────────┐
│   DETERMINE A THIRD PROCESSING STAGE    │
│  THAT DEFINES A CHROMATIC ADAPTATION    │── 920
│   ACCORDING TO THE WHITE POINT          │
└─────────────────────────────────────────┘
```

CONSTRUCTING COLOR PROFILE FOR PARAMETERIZED IMAGE COLOR SPACE

BACKGROUND OF THE INVENTION

The present application describes systems and techniques relating to color management, for example, supporting color management of an image with a parameterized image color space.

Devices that are capable of representing image data (monitors, printers, scanners, cameras, etc.) often have significant variations in color gamut, the range of colors producible by the device. To accommodate this range in device gamuts, a variety of color spaces, and color management systems and techniques have been developed. Color management enables different color space values to be mapped from one device's gamut to another's using color profiles, which define how color information is transformed into or out of a standard reference space called a profile connection space.

Using color management, a human's perception of color from one device representation to another can be kept close to constant, despite the variation in color capabilities of different devices. To assist in color management, the Commission Internationale de L'Eclairage (CIE) has defined various color spaces that are device-independent and encompass the full gamut of human vision, and can thus be used as profile connection spaces. Typical profile connection spaces in color management systems include CIEXYZ and CIELAB. LAB space is a color space having a luminance channel, L, and opponent color channels, A (green↔red) and B (blue↔yellow).

A color profile defines how to transform color information from one color space to another, such as from a device-dependent color space into a profile connection space, or the reverse. Many color profiles also conform to a defined color profile architecture, which provides flexibility in their use. For example, the International Color Consortium (ICC) provides a defined color profile architecture commonly used in many color management systems. ICC profiles have been developed for many different color spaces, which typically have standardized component ranges to facilitate their use.

SUMMARY OF THE INVENTION

In general, the invention features systems and techniques relating to supporting color management of an image with a parameterized image color space. According to an aspect, a color profile that conforms to a defined color profile architecture and that defines a multistage transform capable of translating a first color space to a second color space is generated. An image can be processed using the color profile, and the image can be output. The image includes a parameterized encoding of an image color space with image parameters defining a range and an offset of an image component of the image, and a white point of the image color space. One of the first and second color spaces can be the image color space while the other of the first and second color spaces can be a profile connection space. Moreover, generation of the color profile involves affecting two stages of the multistage transform based on the image parameters.

Generating the color profile can involve increasing image processing precision by fitting output to input data scopes between the two stages of the multistage transform based on the parameterized encoding of the image. Generating the color profile can involve affecting three stages, which include the two stages, of the multistage transform such that the color profile effects chromatic adaptation according to the white point and transcodes the image component according to the range and the offset, where the fitting includes fitting output to input data scopes among the three stages. The image parameters of the parameterized encoding can define ranges, offsets, and bit depths of image components of the image, and the color profile can be a bit-depth independent color profile.

Affecting the two stages can involve determining a first processing stage of a transform-defining element of the defined color profile architecture, wherein the first processing stage accounts for the range and the offset; determining a second processing stage of the transform-defining element, wherein the second processing stage defines at least a portion of a conversion of the image color space to a chromatic adaptation color space; and determining a third processing stage of the transform-defining element, wherein the third processing stage defines a chromatic adaptation in the chromatic adaptation color space according to the white point. Affecting the two stages can involve determining a first processing stage of a transform-defining element of the defined color profile architecture, wherein the first processing stage accounts for the range; determining a second processing stage of the transform-defining element, wherein the second processing stage accounts for the offset and defines at least a portion of a conversion of the image color space to a chromatic adaptation color space; and determining a third processing stage of the transform-defining element, wherein the third processing stage defines a chromatic adaptation in the chromatic adaptation color space according to the white point.

According to another aspect, a system includes a device, and a data processing machine including an input-output interface, an operating system, and a color management software component that generates a color profile for an image. The image includes a parameterized encoding of an image color space with image parameters defining ranges and offsets of image components of the image. The color management software component generates the color profile by representing a transformation including a matrix followed by curves in a pipeline of a defined color profile architecture while increasing processing precision governed by the color profile based on the parameterized encoding. The image parameters can further define a white point of the image color space, and the transformation can include the matrix followed by the curves followed by an additional matrix. The color profile can effect chromatic adaptation according to the white point and can transcode the image components according to the ranges and the offsets, in at least three stages of the pipeline. The color profile can transcode the image components in a multidimensional interpolation table stage and a one dimensional transforms stage of the pipeline, and the color profile can effect chromatic adaptation in a matrix stage of the pipeline.

According to another aspect, a machine-implemented technique includes improving color accuracy of conversion of an image color space of an image by affecting two or more processing stage definitions for a defined image processing pipeline, based on image parameters, such that the defined image processing pipeline transcodes an image component according to a range and an offset. The affecting includes fitting output to input data scopes between two of the processing stage definitions, and the image includes a parameterized encoding of the image color space with the image parameters defining the range and the offset of the image component of the image. The image parameters can further define a white point of the image color space, and the affecting can involve affecting three or more processing stage definitions for the defined image processing pipeline, based on the image parameters, such that the defined image processing pipeline transcodes the image component according to the range and the offset, and effects chromatic adaptation according to the white point.

The invention can be implemented to realize one or more of the following advantages. The systems and techniques described here involve construction of color profiles that accommodate nonstandard data encodings for a color space. The color profiles constructed can be independent of the color space's data bit depth. Moreover, the color profiles constructed can handle transcoding (decoding and/or encoding) of the nonstandard data encodings and provide improved color accuracy. In one embodiment, an ICC profile is constructed that transcodes, color converts and performs chromatic adaptation on a parameterized encoding of an image color space, while also maximizing precision and preventing clipping of valid data. This can prevent color banding and color shifts that might otherwise occur. By distributing parts of the image processing through the stages of a defined processing pipeline based on the encoding of an image color space, quantization error and color error can be minimized.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

FIG. 7 illustrates a transform-defining element according to an implementation.

FIG. 8 shows equations according to an implementation.

FIG. 9 illustrates creation of a transform-defining element according to another implementation.

Like reference symbols in the various drawings indicate like elements.

DETAILED DESCRIPTION

Figure 1:
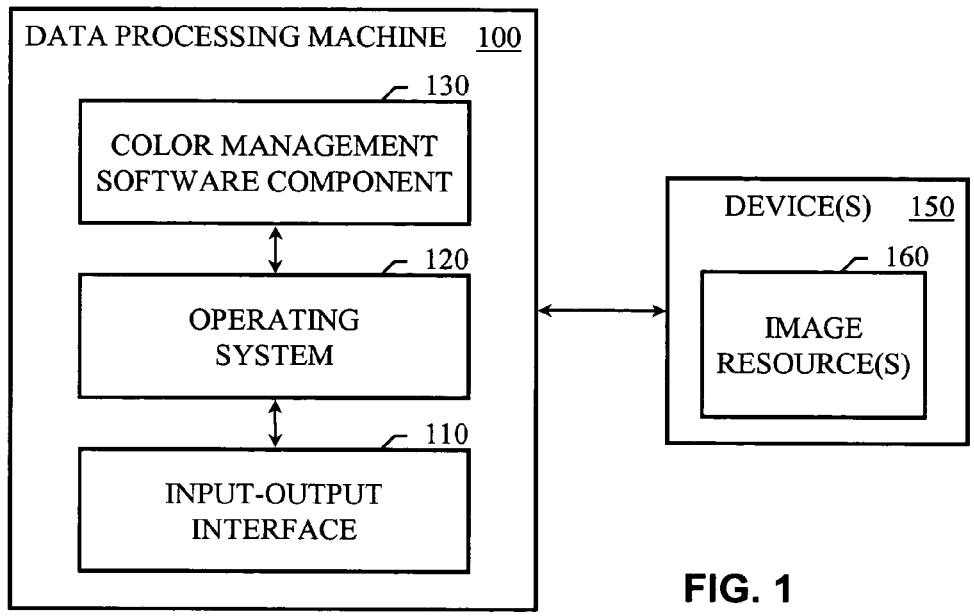
FIG. 1 illustrates a system with parameterized image color space color management.

FIG. 1 illustrates a system with parameterized image color space color management. A data processing machine 100 includes an input-output interface 110 that provides connectivity to one or more devices 150. The device(s) 150 include one or more image resources 160, which have nonstandard color space encodings. The device(s) 150 can be of various types, including storage devices (e.g., hard disks), input-output devices for the machine 100 (e.g., a printer, monitor, scanner, etc.), or consumer electronic devices (e.g., a digital camera, mobile phone, portable electronic poster, digital picture frame, etc.). The device(s) 150 can be local or remote, and can be connected to the machine 100 via a network, wireless link, cable, or system bus. For example, the machine and device 100, 150 can be a personal computer; or the device 150 can be integrated with the machine 100 into a composite device, such as a printer/scanner that includes a processor and performs color management operations, or a portable digital assistant (PDA).

The data processing machine 100 can include an operating system 120, which is software used to control operation of the machine 100 and to direct the processing of programs. The data processing machine 100 includes a color management software component 130 that generates a color profile for an image having a parameterized encoding of an image color space. For example, an image 160 can be a parameterized CIELAB image (e.g., a Joint Photographic Experts Group (JPEG) image with parameterized CIELAB color space, which may have nearly arbitrary component ranges, offsets and bit depths, as well as a nearly arbitrary white point). The color management component 130 can generate a color profile capable of translating the parameterized CIELAB image into a profile connection space.

The color management component 130 can generate a color profile with decoding and/or encoding capability: the decoding capability being decoding a parameterized image color space while translating the color space into a profile connection space, and the encoding capability being encoding a parameterized image color space while translating a profile connection space into the color space. The color management component 130 can be a software application or plug-in for a software application, or a color matching module or color engine. The color management component 130 can be integrated into the operating system 120, or alternatively, no operating system 120 need be present. Various other implementations are also possible, for example, the color management component 130 can be a portion of a document (e.g., a container in a Portable Document Format (PDF) file), or the color management component 130 can be a hardware driver, such as a graphics hardware driver.

Figure 2:
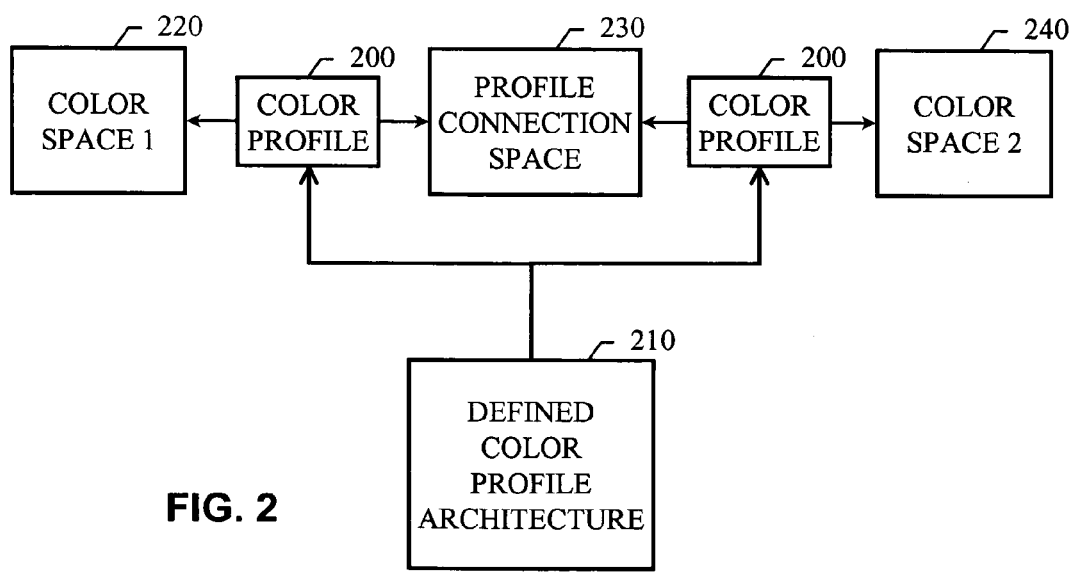
FIG. 2 illustrates a portion of a color-managed workflow in the system of FIG. 1.

FIG. 2 illustrates a portion of a color-managed workflow in the system of FIG. 1. A color profile 200 has been created by the color management component 130 and conforms to a defined color profile architecture 210. For example, the color profile 200 may be an ICC profile. The color profile 200 defines a multistage transform capable of translating from a first color space to a second color space, such as from a color space 220 to a profile connection space 230. The color profile 200 may also define an additional transform capable of translating from the second color space to a third color space. For example, the color profile 200 may translate a color space 220 into a profile connection space 230 and then into a color space 240, which may be a working color space of a software application.

The color space 220 can be a parameterized encoding of an image color space for an image with image parameters defining a range and an offset of an image component, plus a white point of the image color space. For example, the color space 220 can be a parameterized CIELAB image color space. Conventional CIELAB color has canonical component ranges; it is common for applications to assume that any CIELAB data encountered uses the canonical ranges. In the case of ICC 8-bit per component CIELAB data, the canonical component ranges are as follows: L on [0.0 . . . 100.0], A on [−128.0 . . . 127.0], and B on [−128.0 . . . 127.0]. In addition, the canonical white point of CIELAB color is the CIE illuminant D50 [X=0.9642, Y=1.0000, Z=0.8249].

The assumption of canonical ranges on the part of applications and color management systems results in incorrect processing of the color data if it actually represents CIELAB with nonstandard ranges. CIELAB color data is usually encoded as 8 or 16 bit unsigned integer components. The CIELAB component ranges are mapped onto [0 . . . 255] in the 8 bits per component case, or onto [0 . . . 65535] in the 16 bits per component case. This mapping is computed using the concept of data encoding ranges and offsets: the encoding range for a component is the number of units in the span of the data range. For L on [0.0 . . . 100.0], the encoding range, RL, is 100; for A and B on [−128.0 . . . 127.0], the encoding ranges, RA and RB, are both 255. The encoding offsets are the amounts that are to be added to the minimum data range value to equal zero. For L, the offset, OL, is 0. For A and B on [−128.0 . . . 127.0], the encoding offsets are both 128. Given RL, OL, RA, OA, RB, and OB, the encoding to n bits per component is computed as:

$$L_{enc} = \frac{(L+OL)(2^n-1)}{RL};$$ (1)

$$A_{enc} = \frac{(A+OA)(2^n-1)}{RA}; \quad B_{enc} = \frac{(B+OB)(2^n-1)}{RB}$$

In the case of JPEG parameterized CIELAB, the default parameterization is the encoding specified in ITU-T.42, which is a color fax standard. The ITU-T.42 CIELAB ranges are: L on [0.0 . . . 100.0], A on [−85.0 . . . 85.0], B on [−75.0 . . . 125.0]. Thus, an assumption of canonical ranges for CIELAB data in the case of the default ranges for JPEG 2000 parameterized JPX CIELAB would produce serious color errors.

The machine 100 can generate color profiles for images that have a parameterized encoding of an image color space with image parameters defining a range and an offset of an image component of the image, and a white point of the image color space. The machine 100 can construct a new color profile for each new nonstandard range encoding encountered, or the machine 100 can save previously constructed color profiles for use with other images that have the same parameterized ranges, offsets and white point, but different bit depths, as the color profiles constructed can be bit-depth independent (e.g., when the received offsets are expressed in the bit-depth of the incoming data, these offsets can be translated into floating point values and put into the color profile being built without the bit depth dependency). These color profiles can then be used in processing the images. For example, a color profile 200 can be embedded in an image 160 (either before or after compression, such as in the case of JPEG) and saved to a storage device 150; or a color profile 200 can be used in a defined image processing pipeline to transform the image from the image color space to a working color space, and the transformed image can be saved to a memory device 150. Moreover, when generating the color profiles, the color space specified in a header of the color profile may be three color (3CLR) so that a color engine will be sure to use the color profile in place of another color profile to which the color engine may otherwise default.

Figure 3:
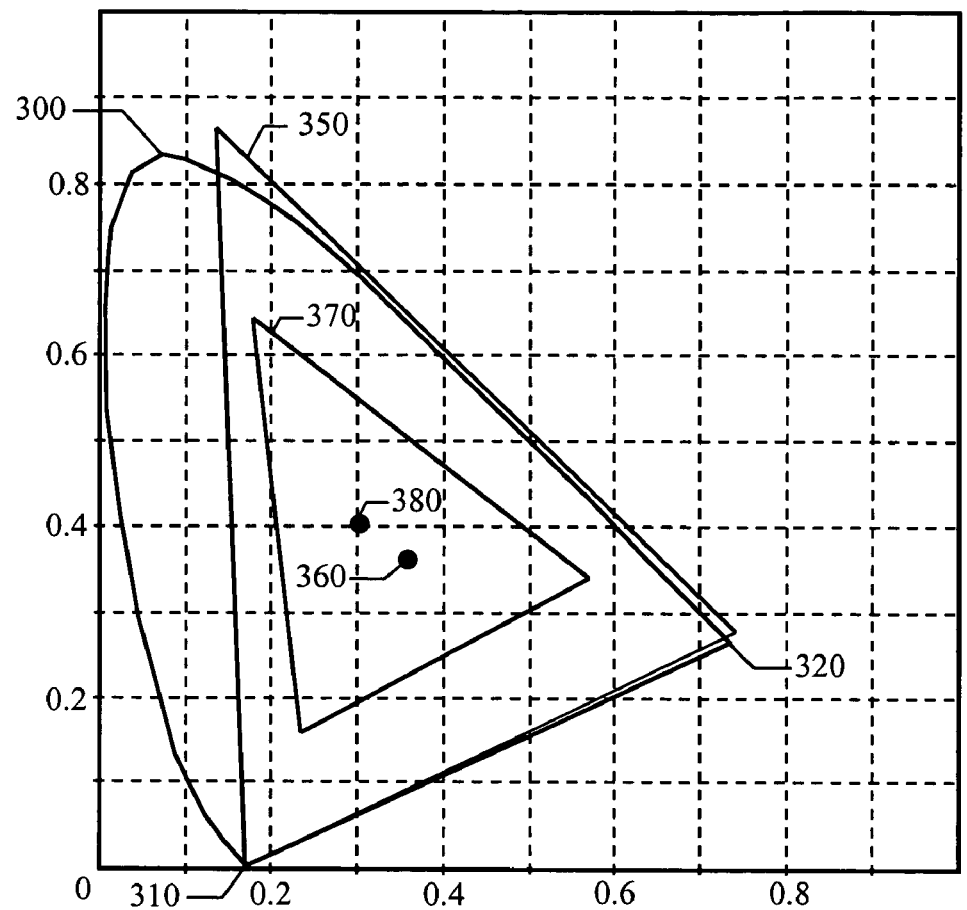
FIG. 3 illustrates example color spaces.

FIG. 3 illustrates example color spaces. Objects with different spectral reflectivities can have the same color appearance, or tristimulus values. XYZ tristimulus values form the basis of the CIE 1931 chromaticity diagram illustrated in FIG. 3, where x, y, and z tristimulus values have been normalized to remove brightness and show chromaticity in only two coordinates, x and y. In this diagram, a horseshoe shaped color space 300 illustrates the full gamut of human vision, where the spectrum locus starts at four hundred and twenty nanometers (nm) at a point 310 and wraps around the horseshoe to six hundred and eighty nm at a point 320.

A color space 350 represents a standardized color space, with canonical encoding ranges, offsets, bit depths and a white point 360 (e.g., the CIE illuminant D50). As can be seen in FIG. 3, a color space can include color values that lie outside the color space 300, and are thus not perceivable by a human. An image color space 370 is of the same general type as the color space 350, but is defined by image parameters that allow for arbitrarily defined component ranges, offsets, bit depths, and white point. Thus, an image can have a color space defined uniquely for that image, including an image specific white point 380.

Figure 4:
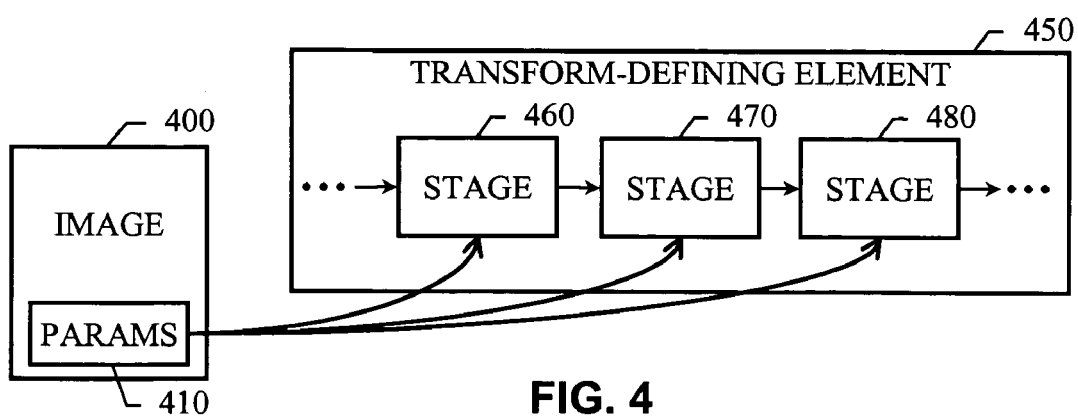
FIG. 4 illustrates creation of a transform-defining element based on image parameters.

FIG. 4 illustrates creation of a transform-defining element 450 based on image parameters 410. The image parameters 410 are additional to the general type of color space (e.g., LAB) and thus create an image color space, a subspace of the general color space. The image parameters 410 can be part of the image 400 (e.g., enumerated parameters specified in a field in the header of the image 400), or retained elsewhere. In general, multiple stages of the transform-defining element 450 are affected, based on the image parameters 410, during generation of the color profile. For example, the image parameters 410 can be taken into account within three processing stage definitions 460, 470, 480 of the transform-defining element 450, which may have only three stages or more than three stages. The transform-defining element 450 can be a lutAtoB tag or a lutBtoA tag in an ICC profile. Example implementations are described in detail below for constructing a lutAtoB tag in an ICC profile (e.g., using the interior processing stages of the lutAtoB tag and setting the A curves and B curves to identity), but the systems and techniques described herein are applicable in different variations, including application to other transform-defining elements and other defined color profile architectures.

The transform-defining element 450 represents a multi-stage transform of the color profile. Once the image parameters 410 are taken into account, the multistage transform can translate from a first color space to a second color space while also effecting chromatic adaptation according to a specified white point, and transcoding image components according to specified ranges, offsets and bit depths. Moreover, the process of taking the image parameters 410 into account during generation of the color profile can involve fitting output to input data scopes between two or more stages of the multistage transform based on the parameterized encoding of the image, increasing image processing precision and avoiding data value clipping.

Figure 5:
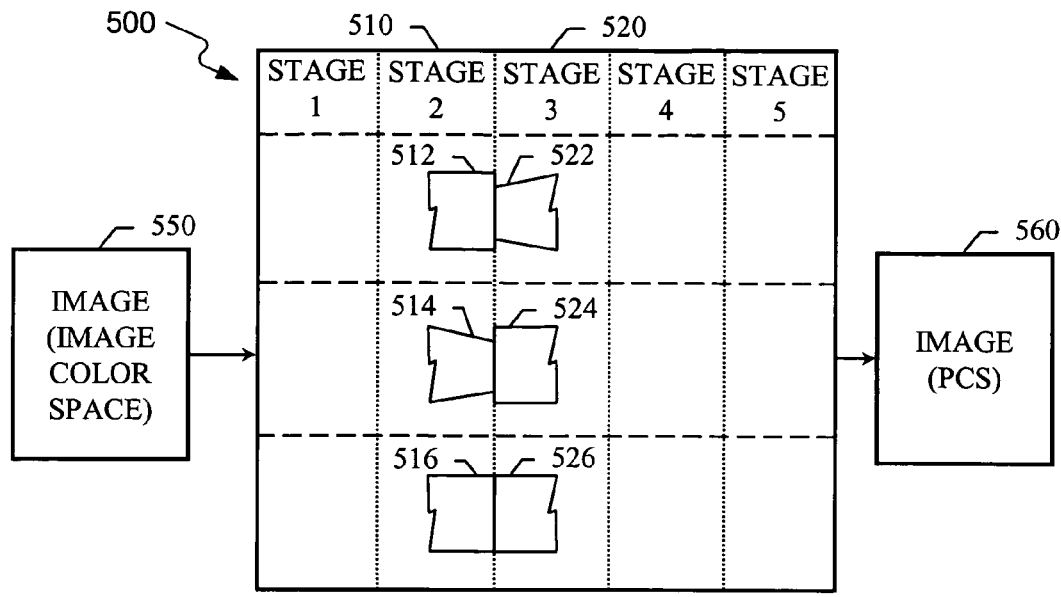
FIG. 5 illustrates fitting output to input data scopes between two stages of a defined image processing pipeline.

FIG. 5 illustrates fitting output to input data scopes between two stages of a defined image processing pipeline 500. The processing pipeline 500 includes stages 1-5 (e.g., a pipeline defined by an ICC lutAtoBtag). An image 550, having a parameterized image color space, is to be translated by the pipeline 500 into an image 560 in a profile connection space (PCS). Decoding of the parameterized image color space can be performed in two stages 510, 520 of the defined image processing pipeline 500, and the way in which the image parameters are taken into account within these two stages can affect the quality of the resulting image data in the image 560.

For example, in a first color profile, an output data scope 512 of the stage 510 for the image 550 is larger than an input data scope 522 of the stage 520. This results in clipping of image data. In a second color profile, an output data scope 514 of the stage 510 for the image 550 is smaller than an input data scope 524 of the stage 520. This results in loss of precision. In contrast, in a third color profile, an output data scope 516 of the stage 510 for the image 550 has been fit to an input data scope 526 of the stage 520. This results in increased precision and improved color accuracy during image processing in the pipeline 500.

Spreading out the application of color space decoding parameters in a defined image processing pipeline can help in fitting output to input data scopes, as the machine representation of the values defining the stages (e.g., the representation of curves and matrix values in the color profile) has a limited precision in the expression of those values (e.g., a 16 bit precision limit for expressing fractions). The range of values that can be pushed through the pipeline is fit to the image color space to be processed using the color profile. The range of theoretical values that could be processed by a pipeline stage without clipping, based on the color profile generated, is the same as the range of actual input values to be fed into the pipeline stage, based on the image color space. Thus, the quantization error, expressed in terms of the output of a pipeline stage, varies with the range of input values possible in the given image color space. Fitting of output to input data scopes can be applied to two or more stages, or all stages, of a transform-defining element of a color profile. Example techniques for performing fitting of output to input data scopes are described below.

Figure 6:
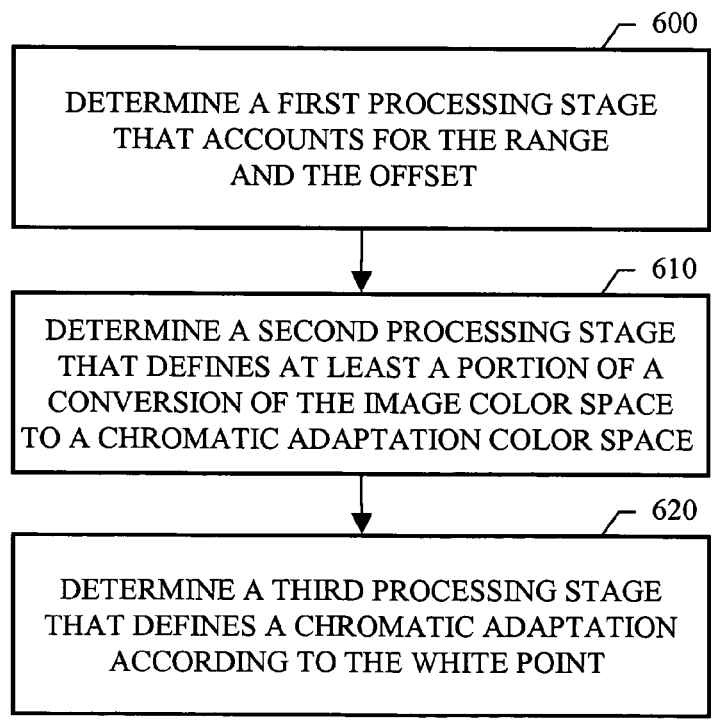
FIG. 6 illustrates creation of a transform-defining element according to an implementation.

FIG. 6 illustrates creation of a transform-defining element according to an implementation. A first processing stage that accounts for the range and the offset of a parameterized color space is determined at 600. A second processing stage that defines at least a conversion of a portion of the image color space to a chromatic adaptation color space is determined at 610. A third processing stage that defines a chromatic adaptation according to the white point of the parameterized color space is determined at 620.

FIG. 7 illustrates a transform-defining element according to an implementation. The first processing stage determined above can be a multidimensional interpolation table 760. The second processing stage determined above can be a set of one dimensional transforms 770 (e.g., M curves in the lutAtoBtag). The third processing stage determined above can be a matrix 780. Thus, for example, mapping of non-canonical ranges, offsets and channel bit depths can be defined in a three dimensional interpolation table stage of the transform-defining element 450, and non-canonical white points can be compensated for in a matrix stage of the transform-defining element 450.

In the context of constructing an ICC v4 profile with a CIEXYZ PCS, the invention can combine the conversion from a non-canonical CIELAB encoding with the conversion from CIELAB to the CIEXYZ D50 PCS, as follows, resulting in color profiles that are independent of the data channel bit depths. However, in some color management systems, the representation of incoming data may be limited to a specified set of bit depths (e.g., limited to 8 bit or 16 bit incoming data). In such cases, the system can be modified to use higher bit depths for data with a bit depth not in the specified set, and appropriate scaling can be applied. For example, in a 8 and 16 bit system, when 12 bit input is provided, a client in the system can put this into a 16 bit field and then apply scaling to make the data appear to be 16 bit data.

In an ICC v4 profile with a CIEXYZ PCS, the lutAtoBtags can be constructed to implement a matrix/offset/1D Luts form of the CIELAB to XYZ conversion, with mapping for the non-canonical ranges, offsets, and channel bit depths. A color lookup table (CLUT) component of the lutAtoBtype tag in ICC can be constructed as a 2×2×2 table derived from the matrix/offset/1D Luts CIELAB formula by running the eight corner input values (e.g., (0,0,0), (0,0,1), ... (1,1,1)) through the matrix. The non-canonical CIELAB encoding ranges and offsets can be rolled into the matrix/offset/1D Luts form, and the CLUT generated can thus handle the mapping of the non-canonical CIELAB encoding ranges and offsets.

The CLUT entries can be made positive by subtracting the minimum CLUT entry from all and normalizing by dividing by the largest CLUT entry. The M curves can be three type-4 parametricCurveType tags of the form:

$$y=(ax+b)^\gamma+e \text{ for } x \geq d \text{ and } y=(cx+f) \text{ for } x<d \quad (2)$$

These curves can denormalize the output from the CLUT and apply the nonlinear function of the CIELAB to XYZ conversion, and scale by 32768/65535.

A chromatic adaptation tag (chad) can be constructed for the illuminant specified in the non-canonical CIELAB parameterization, and this chad matrix can be used in the construction of the matrix stage of the lutAtoBtype tag in ICC. For example, a received white point can be expressed in degrees Kelvin, and this can be translated into an XYZ value for the white point, which is used to calculate the chromatic adaptation matrix. The constructed matrix stage can denormalize the M-curve output and apply the adaptation from the parameterized CIELAB illuminant to the PCS D50 illuminant. Moreover, in the case of using the perceptual intent (one of the rendering intents available during gamut mapping), the constructed matrix stage for an AToB tag can map the parameterized CIELAB's black point to the ICC perceptual intent black.

The following description provides a derivation of JPX parameterized LAB profile elements to further illustrate the description above. Conversion of CIELAB to XYZ can be performed via the following equations:

$$X = X_W * f\left[\frac{(L+16)}{116} + \frac{a}{500}\right] \quad (3)$$

$$Y = Y_W * f\left[\frac{(L+16)}{116}\right]$$

$$Z = Z_W * f\left[\frac{(L+16)}{116} - \frac{b}{200}\right]$$

where $X_W$, $Y_W$, $Z_W$ are the tristimulous values of the white point, and $$f[x] = x^3 \text{ for } x \geq \frac{6}{29},$$

and $$f[x] = \frac{108}{841}\left(x - \frac{4}{29}\right)$$

for $$x < \frac{6}{29}.$$

Equations (3) work for actual CIE L* a* b* units, but in the case of JPX parameterized Lab data, the Lab values are encoded with specifiable ranges and offsets. Encoded JPX Lab can be decoded via the following equations:

$$L = \frac{R_L}{2^{n_L}-1}(L_e - O_L) \quad (4)$$

$$a = \frac{R_a}{2^{n_a}-1}(a_e - O_a)$$

$$b = \frac{R_b}{2^{n_b}-1}(b_e - O_b)$$

where $L_e$, $a_e$, $b_e$ are the JPX encoded Lab values, $R_L$, $R_a$, $R_b$ are the JPX ranges for Lab (in Lab units), $O_L$, $O_a$, $O_b$ are the JPX Lab channel offsets, and $n_L$, $n_a$, $n_b$ are the JPX Lab original encoding bit depths.

In the context of an ICC v4 lutAtoB tag, the incoming L, a, b values ($L_i$, $a_i$, $b_i$) are on [0 . . . 1] because they will already have been divided by ($2^n-1$), and thus, $$L_i = \frac{L_e}{2^{n_L} - 1},$$

$$a_i = \frac{a_e}{2^{n_a} - 1}, \quad b_i = \frac{b_e}{2^{n_b} - 1},$$

which allows equations (4) to be rewritten as:

$$L = R_L L_i - \frac{R_L}{2^{n_L} - 1} O_L \quad (5)$$

$$a = R_a a_i - \frac{R_a}{2^{n_a} - 1} O_a$$

$$b = R_b b_i - \frac{R_b}{2^{n_b} - 1} O_b$$

As the original JPX encoding ranges and bit depths are known, the offsets can be pre-scaled $$\left( O_L = \frac{R_L}{2^{n_L} - 1} O_L, \quad O_a = \frac{R_a}{2^{n_a} - 1} O_a, \quad O_b = \frac{R_b}{2^{n_b} - 1} O_b \right),$$

(note that the offsets $O_L$, $O_a$, $O_b$ have now been redefined), and equations (5) can be simplified to:

$$L = R_L L_i - O_L$$

$$a = R_a a_i - O_a$$

$$b = R_b b_i - O_b \quad (6)$$

Modifying equations (3) above to reflect the conditions within the lutAtoB tag results in:

$$X = X_W * f\left[ \frac{(R_L L_i - O_L + 16)}{116} + \frac{R_a a_i - O_a}{500} \right] \quad (7)$$

$$Y = Y_W * f\left[ \frac{(R_L L_i - O_L + 16)}{116} \right]$$

$$Z = Z_W * f\left[ \frac{(R_L L_i - O_L + 16)}{116} - \frac{R_b b_i - O_b}{200} \right]$$

Equations (3) above can be implemented as a matrix+offset followed by 1D tables. Equations (3) can be rewritten as:

$$X = X_W * f\left[ \frac{1}{116}\left( L + \frac{116}{500} a \right) + \frac{16}{116} \right] \quad (8)$$

$$Y = Y_W * f\left[ \frac{1}{116} L + \frac{16}{116} \right]$$

$$Z = Z_W * f\left[ \frac{1}{116}\left( L - \frac{116}{200} b \right) + \frac{16}{116} \right]$$

The three terms that are each multiplied by $$\frac{1}{116}$$

in equations (8) above can be implemented as a 3×3 matrix:

$$\begin{pmatrix} A \\ B \\ C \end{pmatrix} = \begin{pmatrix} 1 & \left(\frac{116}{500}\right) & 0 \\ 1 & 0 & 0 \\ 1 & 0 & \left(-\frac{116}{200}\right) \end{pmatrix} \cdot \begin{pmatrix} L \\ a \\ b \end{pmatrix} = \begin{pmatrix} L + \frac{116}{500} a \\ L \\ L - \frac{116}{200} b \end{pmatrix} \quad (9)$$

where the 3×3 matrix reduces to $$\begin{pmatrix} 1 & \left(\frac{29}{125}\right) & 0 \\ 1 & 0 & 0 \\ 1 & 0 & \left(-\frac{29}{50}\right) \end{pmatrix}.$$

The rest of equations (8) can be captured in three 1D Luts:

$$\begin{pmatrix} X \\ Y \\ Z \end{pmatrix} = \begin{pmatrix} X_W * f\left[\frac{16 + A}{116}\right] \\ Y_W * f\left[\frac{16 + B}{116}\right] \\ Z_W * f\left[\frac{16 + C}{116}\right] \end{pmatrix} \quad (10)$$

where A, B, C are the output of the matrix operation, and $f$ is the same function used in equations (3).

Equations (7) can be implemented in a similar manner with the addition of a vector of offsets to the form above: matrix+offsets vector, 1D Lut form. Equations (7) can be rewritten as:

$$X = X_W * f\left[ \frac{1}{116}\left( R_L L_i + \frac{116}{500} R_a a_i - \frac{116 O_a}{500} \right) + \frac{(16 - O_L)}{116} \right] \quad (11)$$

$$Y = Y_W * f\left[ \frac{1}{116} R_L L_i + \frac{16 - O_L}{116} \right]$$

$$Z = Z_W * f\left[ \frac{1}{116}\left( R_L L_i - \frac{116}{200} R_b b_i + \frac{116 O_b}{200} \right) + \frac{(16 - O_L)}{116} \right]$$

FIG. 8 shows equations (11) with various terms highlighted. The boxed terms 800 can be implemented as a 3×3 matrix as follows:

$$\begin{pmatrix} A \\ B \\ C \end{pmatrix} = \begin{pmatrix} R_L & \left(\frac{29}{125} R_a\right) & 0 \\ R_L & 0 & 0 \\ R_L & 0 & \left(-\frac{29}{50} R_b\right) \end{pmatrix} \cdot \begin{pmatrix} L_i \\ a_i \\ b_i \end{pmatrix} = \begin{pmatrix} R_L L_i + \frac{116}{500} R_a a_i \\ R_L L_i \\ R_L L_i - \frac{116}{200} R_b b_i \end{pmatrix} \quad (12)$$

The circled terms 810 can be added as an offset vector:

$$\begin{pmatrix} D \\ E \\ F \end{pmatrix} = \begin{pmatrix} A \\ B \\ C \end{pmatrix} + \begin{pmatrix} -\frac{116 O_a}{500} \\ 0 \\ \frac{116 O_b}{500} \end{pmatrix} = \begin{pmatrix} R_L L_i + \frac{116}{500} R_a a_i & -\frac{116 O_a}{500} \\ R_L L_i & 0 \\ R_L L_i - \frac{116}{500} R_b b_i & -\frac{116 O_b}{500} \end{pmatrix} \quad (13)$$

The remaining circled terms 820 can be captured as three 1D Luts:

$$\begin{pmatrix} X \\ Y \\ Z \end{pmatrix} = \begin{pmatrix} X_W * f\left[\frac{16 - O_L + D}{116}\right] \\ Y_W * f\left[\frac{16 - O_L + E}{116}\right] \\ Z_W * f\left[\frac{16 - O_L + F}{116}\right] \end{pmatrix} \quad (14)$$

Note that $O_L$ is usually zero, as L* is positive.

As the JPX parameterized Lab spaces can have varying white points, the conversion should go Lab→$XYZ_{jpxWP}$→$XYZ_{pcsWP}$. The matrix of the lutAtoB tag can be used to handle the XYZ white point conversion, the matrix+offset described above can be implemented in a 2×2×2 CLUT in the lutAtoB tag, and the M-curves of the lutAtoB tag can handle the rest.

A 2×2×2 CLUT that produces results equivalent to a 3×3 matrix can be generated by running the input corners of the CLUT through the matrix+offset. Using the matrix and offset from equations (12) and (13) above results in:

$$\begin{pmatrix} R_L & \left(\frac{29}{125}R_a\right) & 0 \\ R_L & 0 & 0 \\ R_L & 0 & \left(-\frac{29}{50}R_b\right) \end{pmatrix} \cdot \begin{pmatrix} 0 \\ 0 \\ 0 \end{pmatrix} + \begin{pmatrix} \left(-\frac{29}{125}O_a\right) \\ 0 \\ \left(\frac{29}{50}O_b\right) \end{pmatrix} = \begin{pmatrix} \left(-\frac{29}{125}O_a\right) \\ 0 \\ \left(\frac{29}{50}O_b\right) \end{pmatrix} \quad (15)$$

$$\begin{pmatrix} R_L & \left(\frac{29}{125}R_a\right) & 0 \\ R_L & 0 & 0 \\ R_L & 0 & \left(-\frac{29}{50}R_b\right) \end{pmatrix} \cdot \begin{pmatrix} 0 \\ 0 \\ 1 \end{pmatrix} + \begin{pmatrix} \left(-\frac{29}{125}O_a\right) \\ 0 \\ \left(\frac{29}{50}O_b\right) \end{pmatrix} = \begin{pmatrix} \left(-\frac{29}{125}O_a\right) \\ 0 \\ \left(\frac{29}{50}(O_b - R_b)\right) \end{pmatrix}$$

$$\begin{pmatrix} R_L & \left(\frac{29}{125}R_a\right) & 0 \\ R_L & 0 & 0 \\ R_L & 0 & \left(-\frac{29}{50}R_b\right) \end{pmatrix} \cdot \begin{pmatrix} 0 \\ 1 \\ 0 \end{pmatrix} + \begin{pmatrix} \left(-\frac{29}{125}O_a\right) \\ 0 \\ \left(\frac{29}{50}O_b\right) \end{pmatrix} = \begin{pmatrix} \left(\frac{29}{125}(R_a - O_a)\right) \\ 0 \\ \left(\frac{29}{50}O_b\right) \end{pmatrix}$$

$$\begin{pmatrix} R_L & \left(\frac{29}{125}R_a\right) & 0 \\ R_L & 0 & 0 \\ R_L & 0 & \left(-\frac{29}{50}R_b\right) \end{pmatrix} \cdot \begin{pmatrix} 0 \\ 1 \\ 1 \end{pmatrix} + \begin{pmatrix} \left(-\frac{29}{125}O_a\right) \\ 0 \\ \left(\frac{29}{50}O_b\right) \end{pmatrix} = \begin{pmatrix} \left(\frac{29}{125}(R_a - O_a)\right) \\ 0 \\ \left(\frac{29}{50}(O_b - R_b)\right) \end{pmatrix}$$

$$\begin{pmatrix} R_L & \left(\frac{29}{125}R_a\right) & 0 \\ R_L & 0 & 0 \\ R_L & 0 & \left(-\frac{29}{50}R_b\right) \end{pmatrix} \cdot \begin{pmatrix} 1 \\ 0 \\ 0 \end{pmatrix} + \begin{pmatrix} \left(-\frac{29}{125}O_a\right) \\ 0 \\ \left(\frac{29}{50}O_b\right) \end{pmatrix} = \begin{pmatrix} \left(R_L - \frac{29}{125}O_a\right) \\ R_L \\ \left(R_L + \frac{29}{50}O_b\right) \end{pmatrix}$$

$$\begin{pmatrix} R_L & \left(\frac{29}{125}R_a\right) & 0 \\ R_L & 0 & 0 \\ R_L & 0 & \left(-\frac{29}{50}R_b\right) \end{pmatrix} \cdot \begin{pmatrix} 1 \\ 0 \\ 1 \end{pmatrix} + \begin{pmatrix} \left(-\frac{29}{125}O_a\right) \\ 0 \\ \left(\frac{29}{50}O_b\right) \end{pmatrix} = \begin{pmatrix} \left(R_L - \frac{29}{125}O_a\right) \\ R_L \\ \left(R_L + \frac{29}{50}(O_b - R_b)\right) \end{pmatrix}$$

$$\begin{pmatrix} R_L & \left(\frac{29}{125}R_a\right) & 0 \\ R_L & 0 & 0 \\ R_L & 0 & \left(-\frac{29}{50}R_b\right) \end{pmatrix} \cdot \begin{pmatrix} 1 \\ 1 \\ 0 \end{pmatrix} + \begin{pmatrix} \left(-\frac{29}{125}O_a\right) \\ 0 \\ \left(\frac{29}{50}O_b\right) \end{pmatrix} = \begin{pmatrix} \left(R_L + \frac{29}{125}(R_a - O_a)\right) \\ R_L \\ \left(R_L + \frac{29}{50}O_b\right) \end{pmatrix}$$

$$\begin{pmatrix} R_L & \left(\frac{29}{125}R_a\right) & 0 \\ R_L & 0 & 0 \\ R_L & 0 & \left(-\frac{29}{50}R_b\right) \end{pmatrix} \cdot \begin{pmatrix} 1 \\ 1 \\ 1 \end{pmatrix} + \begin{pmatrix} \left(-\frac{29}{125}O_a\right) \\ 0 \\ \left(\frac{29}{50}O_b\right) \end{pmatrix} = \begin{pmatrix} \left(R_L + \frac{29}{125}(R_a - O_a)\right) \\ R_L \\ \left(R_L + \frac{29}{50}(O_b - R_b)\right) \end{pmatrix}$$

This results in the following raw CLUT:

$$\begin{pmatrix} 000 & \left(-\frac{29O_a}{125}\right) & (0) & \left(\frac{29O_b}{50}\right) \\ 001 & \left(-\frac{29O_a}{125}\right) & (0) & \left(\frac{29}{50}(O_b - R_b)\right) \\ 010 & \left(\frac{29}{125}(R_a - O_a)\right) & (0) & \left(\frac{29O_b}{50}\right) \\ 011 & \left(\frac{29}{125}(R_a - O_a)\right) & (0) & \left(\frac{29}{50}(O_b - R_b)\right) \\ 100 & \left(R_L - \frac{29O_a}{125}\right) & (R_L) & \left(R_L + \frac{29O_b}{50}\right) \\ 101 & \left(R_L - \frac{29O_a}{125}\right) & (R_L) & \left(R_L + \frac{29}{50}(O_b - R_b)\right) \\ 110 & \left(R_L + \frac{29}{125}(R_a - O_a)\right) & (R_L) & \left(R_L + \frac{29O_b}{50}\right) \\ 111 & \left(R_L + \frac{29}{125}(R_a - O_a)\right) & (R_L) & \left(R_L + \frac{29}{50}(O_b - R_b)\right) \end{pmatrix} \quad (16)$$

However, an ICC v4 CLUT should have only positive values and produce output on [0.0 . . . 1.0]. For a given raw CLUT, these conditions can be satisfied by determining minimum and maximum values, CLUTmin and CLUTmax, from the entries of the raw CLUT. All the values in the CLUT can then be forced to $\geq 0$ by subtracting CLUTmin from each entry, and output from the CLUT can be made to fall on [0.0 . . . 1.0] by dividing the elements of the raw CLUT by (CLUTmax−CLUTmin). This yields the following positive, normalized CLUT:

$$\begin{pmatrix} \left(\frac{-\frac{29O_a}{125} - CLUTmin}{CLUTmax - CLUTmin}\right) & \left(\frac{-CLUTmin}{CLUTmax - CLUTmin}\right) & \left(\frac{\frac{29O_b}{50} - CLUTmin}{CLUTmax - CLUTmin}\right) \\ \left(\frac{-\frac{29O_a}{125} - CLUTmin}{CLUTmax - CLUTmin}\right) & \left(\frac{-CLUTmin}{CLUTmax - CLUTmin}\right) & \left(\frac{\frac{29}{50}(O_b - R_b) - CLUTmin}{CLUTmax - CLUTmin}\right) \\ \left(\frac{\frac{29}{125}(R_a - O_a) - CLUTmin}{CLUTmax - CLUTmin}\right) & \left(\frac{-CLUTmin}{CLUTmax - CLUTmin}\right) & \left(\frac{\frac{29O_a}{50}0 - CLUTmin}{CLUTmax - CLUTmin}\right) \\ \left(\frac{\frac{29}{125}(R_a - O_a) - CLUTmin}{CLUTmax - CLUTmin}\right) & \left(\frac{-CLUTmin}{CLUTmax - CLUTmin}\right) & \left(\frac{\frac{29}{50}(O_b - R_b) - CLUTmin}{CLUTmax - CLUTmin}\right) \\ \left(\frac{R_L - \frac{29O_a}{125} - CLUTmin}{CLUTmax - CLUTmin}\right) & \left(\frac{R_L - CLUTmin}{CLUTmax - CLUTmin}\right) & \left(\frac{R_L + \frac{29O_b}{50} - CLUTmin}{CLUTmax - CLUTmin}\right) \\ \left(\frac{R_L + \frac{29O_a}{125} - CLUTmin}{CLUTmax - CLUTmin}\right) & \left(\frac{R_L - CLUTmin}{CLUTmax - CLUTmin}\right) & \left(\frac{R_L + \frac{29}{50}(O_b + R_b) - CLUTmin}{CLUTmax - CLUTmin}\right) \\ \left(\frac{R_L + \frac{29}{125}(R_a - O_a) - CLUTmin}{CLUTmax - CLUTmin}\right) & \left(\frac{R_L - CLUTmin}{CLUTmax - CLUTmin}\right) & \left(\frac{R_L + \frac{29O_b}{50} - CLUTmin}{CLUTmax - CLUTmin}\right) \\ \left(\frac{R_L + \frac{29}{125}(R_a - O_a) - CLUTmin}{CLUTmax - CLUTmin}\right) & \left(\frac{R_L - CLUTmin}{CLUTmax - CLUTmin}\right) & \left(\frac{R_L + \frac{29}{50}(O_b - R_b) - CLUTmin}{CLUTmax - CLUTmin}\right) \end{pmatrix} \quad (17)$$

Plugging the ICC PCS Lab Range and Offsets [$R_L$=100, $O_L$=0, $R_a$=255, $O_a$=128, $R_b$=255, $O_b$=128] into (16) above results in the following raw CLUT:

$$\begin{pmatrix} \left(-\frac{3712}{125}\right) & (0) & \left(\frac{1856}{25}\right) \\ \left(-\frac{3712}{125}\right) & (0) & \left(-\frac{3683}{50}\right) \\ \left(\frac{3683}{125}\right) & (0) & \left(\frac{1856}{25}\right) \\ \left(\frac{3683}{125}\right) & (0) & \left(-\frac{3683}{50}\right) \\ \left(\frac{8788}{125}\right) & (100) & \left(\frac{4356}{25}\right) \\ \left(\frac{8788}{125}\right) & (100) & \left(\frac{1317}{50}\right) \\ \left(\frac{16183}{125}\right) & (100) & \left(\frac{4356}{25}\right) \\ \left(\frac{16183}{125}\right) & (100) & \left(\frac{1317}{50}\right) \end{pmatrix} = \begin{pmatrix} (-29.696) & (0.) & (74.24) \\ (-29.696) & (0.) & (-73.66) \\ (29.464) & (0.) & (74.24) \\ (29.464) & (0.) & (-73.66) \\ (70.304) & (100.) & (174.24) \\ (70.304) & (100.) & (26.34) \\ (129.464) & (100.) & (174.24) \\ (129.464) & (100.) & (26.34) \end{pmatrix} \quad (18)$$

which then gives a CLUTmin and CLUTmax as:

$$CLUTmin = -\frac{3683}{50} = -73.66;$$

$$CLUTmax = \frac{4356}{25} = 174.24.$$

Subtracting by CLUTmin and dividing by (CLUTmax−CLUTmin) gives a positive normalized CLUT:

$$\begin{pmatrix} \left(\frac{10991}{61975}\right) & \left(\frac{3683}{12395}\right) & \left(\frac{1479}{2479}\right) \\ \left(\frac{10991}{61975}\right) & \left(\frac{3683}{12395}\right) & (0) \\ \left(\frac{25781}{61975}\right) & \left(\frac{3683}{12395}\right) & \left(\frac{1479}{2479}\right) \\ \left(\frac{25781}{61975}\right) & \left(\frac{3683}{12395}\right) & (0) \\ \left(\frac{35991}{61975}\right) & \left(\frac{8683}{12395}\right) & (1) \\ \left(\frac{35991}{61975}\right) & \left(\frac{8683}{12395}\right) & \left(\frac{1000}{2479}\right) \\ \left(\frac{50781}{61975}\right) & \left(\frac{8683}{12395}\right) & (1) \\ \left(\frac{50781}{61975}\right) & \left(\frac{8683}{12395}\right) & \left(\frac{1000}{2479}\right) \end{pmatrix} \qquad (19)$$

$$= \begin{pmatrix} (0.177346) & (0.291736) & (0.596612) \\ (0.177346) & (0.297136) & (0.) \\ (0.41599) & (0.297136) & (0.596612) \\ (0.41599) & (0.297136) & (0.) \\ (0.580734) & (0.700524) & (1.) \\ 0.580734 & 0.700524 & 0.403388 \\ (0.819379) & (0.700524) & (1.) \\ (0.819379) & (0.700524) & (0.403388) \end{pmatrix}$$

Multiplying this by 65535 gives the following hex entries for the ICC PCS Lab CLUT:

$$\begin{pmatrix} (2d66_{16}) & (4c11_{16}) & (98bb_{16}) \\ (2d66_{16}) & (4c11_{16}) & (0_{16}) \\ (6a7e_{16}) & (4c11_{16}) & (98bb_{16}) \\ (6a7e_{16}) & (4c11_{16}) & (0_{16}) \\ (94aa_{16}) & (b355_{16}) & (\textit{ffff}_{16}) \\ (94aa_{16}) & (b355_{16}) & (6744_{16}) \\ (d1c2_{16}) & (b355_{16}) & (\textit{ffff}_{16}) \\ (d1c2_{16}) & (b355_{16}) & (6744_{16}) \end{pmatrix} \qquad (20)$$

This CLUT thus handles the processing up through equation (13) above, and the M curves can handle equation (14).

As a check regarding adding the offset to each of the CLUT corners, as in equations (15), consider bilinear interpolation: the offset after interpolation, $x=(ax_1+bx_2)+O_x$, is not equal to the offset before interpolation, $x=a(x_1+O_x)+b(x_2+O_x)$; but for linear interpolation with $b=(1−a)$, simplifying these equations results in:

$$x=[a(x_1+(1-a)x_2)+O_x]=ax_1+O_x-(-1+a)x_2$$

$$x=[a(x_1+O_x)+(1-a)(x_2+O_x)]=O_x+ax_1-(-1+a)x_2 \qquad (21)$$

Thus, they are equivalent. Here is a full comparison of matrix+offsets with CLUT with offsets added before interpolation:

$$\begin{pmatrix} e_1 & e_2 & e_3 \\ e_4 & e_5 & e_6 \\ e_7 & e_8 & e_9 \end{pmatrix} \cdot \begin{pmatrix} L \\ a \\ b \end{pmatrix} + \begin{pmatrix} e_{10} \\ e_{11} \\ e_{12} \end{pmatrix} = \begin{pmatrix} Le_1 + ae_2 + be_3 + e_{10} \\ Le_4 + ae_5 + be_6 + e_{11} \\ Le_7 + ae_8 + be_6 + e_{12} \end{pmatrix} \qquad (22)$$

Doing this via CLUT with offsets added to the CLUT:

$$m1 = \begin{pmatrix} e_1 & e_2 & e_3 \\ e_4 & e_5 & e_6 \\ e_7 & e_8 & e_9 \end{pmatrix}; \qquad (23)$$

$$\text{Matrix Form} \left[ \text{CLUT1} = \begin{Bmatrix} m1. \;\{\{0\},\;\{0\},\;\{0\}\}, \\ m1. \;\{\{0\},\;\{0\},\;\{1\}\}, \\ m1. \;\{\{0\},\;\{1\},\;\{0\}\}, \\ m1. \;\{\{0\},\;\{1\},\;\{1\}\}, \\ m1. \;\{\{1\},\;\{0\},\;\{0\}\}, \\ m1. \;\{\{1\},\;\{0\}\;\{1\}\}, \\ m1. \;\{\{1\},\;\{1\},\;\{0\}\}, \\ m1. \;\{\{1\},\;\{1\},\;\{1\}\} \end{Bmatrix} \right]$$

$$\begin{pmatrix} (0) & (0) & (0) \\ (e_3) & (e_6) & (e_9) \\ (e_2) & (e_5) & (e_8) \\ (e_2+e_3) & (e_5+e_6) & (e_8+e_9) \\ (e_1) & (e_4) & (e_7) \\ (e_1+e_3) & (e_4+e_6) & (e_7+e_9) \\ (e_1+e_2) & (e_4+e_5) & (e_7+_8) \\ (e_1+e_2+e_3) & (e_4+e_5+e_6) & (e_7+e_8+e_9) \end{pmatrix}$$

Adding in the offsets:

MatrixForm[CLUTwOffs=Map[#+{e10,e11,e12}&, CLUT1]] (24)

$$\begin{pmatrix} (e_{10}) & (e_{11}) & (e_{12}) \\ (e_3+e_{10}) & (e_6+e_{11}) & (e_9+e_{12}) \\ (e_2+e_{10}) & (e_5+e_{11}) & (e_8+e_{12}) \\ (e_2+e_3+e_{10}) & (e_5+e_6+e_{11}) & (e_8+e_9+e_{12}) \\ (e_1+e_{10}) & (e_4+e_{11}) & (e_7+e_{12}) \\ (e_1+e_3+e_{10}) & (e_4+e_6+e_{11}) & (e_7+e_9+e_{12}) \\ (e_1+e_2+e_{10}) & (e_4+e_5+e_{11}) & (e_7+e_8+e_{12}) \\ (e_1+e_2+e_3+e_{10}) & (e_4+e_5+e_6+e_{11}) & (e_7+e_8+e_9+e_{12}) \end{pmatrix}$$

And defining a trilinear interpolator:
trilin[CLUT_, X1_, X2_, X3_]:=
Module [{A0, A1, A2, A3, A4, A5, A6, A7},
A0=CLUT [[1]];
A1=CLUT [[5]]−CLUT [[1]];
A2=CLUT [[3]]−CLUT [[1]];
A3=CLUT [[2]]−CLUT [[1]];
A4=CLUT [[7]]−CLUT [[5]]−CLUT [[3]]+CLUT [[1]];
A5=CLUT [[6]]−CLUT [[2]]−CLUT [[5]]+CLUT [[1]];
A6=CLUT [[4]]−CLUT [[2]]−CLUT [[3]]+CLUT [[1]];

A7=CLUT [[8]]−CLUT [[4]]−CLUT [[7]]+CLUT [[5]]+CLUT [[2]]+CLUT [[3]]−CLUT [[1]]−CLUT [[6]];
(A0+(A1*X1)+(A2*X2)+(A3*X3)+(X1*A2)+A5 (X1*X3)+A6(X2*X3)+A7(X1*X2/X3))];
MatrixForm[trilin[CLUTwOffs, L, a, b]]

$$\begin{pmatrix} Le_1 + ae_2 + be_3 + e_{10} \\ Le_4 + ae_5 be_6 + e_{11} \\ Le_7 + ae_8 + be_9 + e_{12} \end{pmatrix}$$

which equals (22) above.

With respect to the M curves, equation (14) is now presented again with the $O_L$ dropped, as $O_L$ is zero in this implementation, and D, E, F are the output from the CLUT $$\begin{pmatrix} X \\ Y \\ Z \end{pmatrix} = \begin{pmatrix} X_W * f\left[\frac{16+D}{116}\right] \\ Y_W * f\left[\frac{16+E}{116}\right] \\ Z_W * f\left[\frac{16+F}{116}\right] \end{pmatrix} \qquad (25)$$

The output of the CLUT is on [0.0 . . . 1.0], and the denormalized output value can be obtained by multiplying by (CLUTmax−CLUTmin) and then adding CLUTmin:

$$\begin{pmatrix} X \\ Y \\ Z \end{pmatrix} = \begin{pmatrix} X_W * f\left[\frac{16+D(CLUT\max - CLUT\min) + CLUT\min}{116}\right] \\ Y_W * f\left[\frac{16+E(CLUT\max - CLUT\min) + CLUT\min}{116}\right] \\ Z_W * f\left[\frac{16+F(CLUT\max - CLUT\min) + CLUT\min}{116}\right] \end{pmatrix} \qquad (26)$$

Looking at the function $f$ again, $f[x]=x^3$ for $$x \geq \frac{6}{29},$$

and $$f[x] = \frac{108}{841}\left(x - \frac{4}{29}\right)$$

for $$x < \frac{6}{29},$$

and plugging in the terms for D from equation (26) into the function $f$ results in:

$$f\left[\frac{16 + D(CLUT\max - CLUT\min) + CLUT\min}{116}\right] = \qquad (27)$$
$$\left(\frac{16 + D(CLUT\max - CLUT\min) + CLUT\min}{116}\right)^3$$

for $$\frac{16 + D(CLUT\max - CLUT\min) + CLUT\min}{116} \geq \frac{6}{29},$$

which resolves to $$D \geq -\frac{CLUT\min - 8}{CLUT\max - CLUT\min},$$

and $$f\left[\frac{16 + D(CLUT\max - CLUT\min) + CLUT\min}{116}\right] = \qquad (28)$$
$$\frac{108}{841}\left(\frac{16 + D(CLUT\max - CLUT\min) + CLUT\min}{116} - \frac{4}{29}\right) =$$
$$\frac{27(D(CLUT\max - CLUT\min) + CLUT\min)}{24389}$$

for $$\frac{16 + D(CLUT\max - CLUT\min) - CLUT\min}{116} < \frac{6}{29},$$

which resolves to $$D < -\frac{CLUT\min - 8}{CLUT\max - CLUT\min}.$$

This is done as follows:
Solve $$\left[\frac{16 + D(CLUT\max - CLUt\min + CLUT\min}{116}\right] = \frac{6}{29}, D\right]$$

$$\left\{\left\{D \to -\frac{-8 + CLUT\min}{CLUT\max - CLUT\min}\right\}\right\}$$

Then by scaling the output from the M curves by $$\frac{32768}{65535}$$

to get it onto the correct range for the matrix stage, the equations in (26) become:

$$X = X_W\left(\frac{32768}{65535}\right)\left(\frac{16 + D(CLUT\max - CLUT\min) + CLUT\min}{116}\right) \quad (29)$$

for $D \geq -\dfrac{CLUT\min - 8}{CLUT\max - CLUT\min}$ and $X =$ $$X_W\left(\frac{32768}{65535}\right)\frac{27(D(CLUT\max - CLUT\min) + CLUT\min)}{24389} \text{ for } D <$$

$$-\frac{CLUT\min - 8}{CLUT\max - CLUT\min} \quad Y =$$

$$Y_W\left(\frac{32768}{65535}\right)\left(\frac{16 + E(CLUT\max - CLUT\min) + CLUT\min}{116}\right)^3$$

for $E \geq -\dfrac{CLUT\min - 8}{CLUT\max - CLUT\min}$ and $Y =$ $$Y_W\left(\frac{32768}{65535}\right)\left[\frac{27(E(CLUT\max - CLUT\min) + CLUT\min)}{24389}\right]$$

for $E < -\dfrac{CLUT\min - 8}{CLUT\max - CLUT\min}$ $Z = Z_W\left(\dfrac{32768}{65535}\right)$ $$\left(\frac{16 + F(CLUT\max - CLUT\min) + CLUT\min}{24389}\right)^3$$

for $F \geq -\dfrac{CLUT\min - 8}{CLUT\max - CLUT\min}$ and $Z =$ $$Z_W\left(\frac{32768}{65535}\right)\frac{27(F(CLUT\max - CLUT\min) + CLUT\min}{24389}$$

for $F < -\dfrac{CLUT\min - 8}{CLUT\max - CLUT\min}$

The equations (29) can be represented as ICC type 4 parametric curves, which have the following structure: $y = (ax+b)^\gamma + e$ for $(x \geq d)$, and $y = cx+f$ for $(x < d)$. Looking at just the X cases in (29), the initial factor can be moved inside the cubed expression by taking its cube root, and the cubed portion in (29) can be rewritten to result in:

$$X = \quad (30)$$

$$\left(X_W\left(\frac{32768}{65535}\right)\right)^{\frac{1}{3}}\left(\frac{(CLUT\max - CLUT\min)}{116}D + \frac{16 + CLUT\min}{116}\right)^3$$

for $D \geq -\dfrac{CLUT\min - 8}{CLUT\max - CLUT\min}$ which puts this in a form that matches $y = (ax+b)^\gamma + e$ for $x \geq d$:

$$X = \left(\left(X_W\left(\frac{32768}{65535}\right)\right)^{\frac{1}{3}}\left(\frac{(CLUT\max - CLUT\min)}{116}\right)D + \quad (31)\right.$$

$$\left.\left(X_W\left(\frac{32768}{65535}\right)\right)^{\frac{1}{3}}\left(\frac{16 + CLUT\min}{116}\right)\right)^3 \text{ for } D \geq$$

$$-\frac{CLUT\min - 8}{CLUT\max - CLUT\min}$$

resulting in:

$$\gamma = 3$$

$$a = \left(\frac{(CLUT\max - CLUT\min)}{116}\right)\left(\left(\frac{32768}{65535}\right)X_W\right)^{\frac{1}{3}}$$

$$b = \left(\frac{16 + CLUT\min}{116}\right)\left(\left(\frac{32768}{65535}\right)X_W\right)^{\frac{1}{3}}$$

$$d = -\frac{CLUT\min - 8}{CLUT\max - CLUT\min}$$

$$e = 0$$

For the second form for X in (29):

$$X = X_W\left(\frac{32768}{65535}\right)\frac{27(D(CLUT\max - CLUT\min) + CLUT\min)}{24389}$$

for $D < -\dfrac{CLUT\min - 8}{CLUT\max - CLUT\min}$ which can be put into $y = cx+f$ form:

$$X = X_W\left(\frac{32768}{65535}\right)\left(\frac{27}{24389}\right)(CLUT\max - CLUT\min)D + \quad (32)$$

$$X_W\left(\frac{32768}{65535}\right)\frac{27CLUT\min}{24389} \text{ for } D < -\frac{CLUT\min - 8}{CLUT\max - CLUT\min}$$

which simplifies to:

$$X = \frac{294912}{532777705}(CLUT\max - CLUT\min)X_W D +$$

$$\frac{294912}{532777705}CLUT\min X_W \text{ for } D < -\frac{CLUT\min - 8}{CLUT\max - CLUT\min}$$

and this results in:

$$c = \frac{294912}{532777705}(CLUT\max - CLUT\min)X_W$$

$$f = \frac{294912}{632777705}CLUT\min X_W$$

Here are Mathematica® simplifications of the two terms in (32):

$$\text{Simplify}\left[X_W\left(\frac{32768}{65535}\right)\left(\frac{27}{24389}\right)(CLUT\max - CLUT\min)D\right]$$

$$\frac{294912(CLUT\max - CLUT\min)DX_W}{532777705}$$

$$\text{Simplify}\left[X_W\left(\frac{32768}{65535}\right)\frac{27CLUT\min}{24389}\right] \frac{294912 CLUT\min X_W}{532777705}$$

So the parameters for the type 4 parametric curve tags are:

$$\gamma = 3$$

$$a = \left(\frac{(CLUT\max - CLUT\min)}{116}\right)\left(\left(\frac{32768}{65535}\right)[X_W|Y_W|Z_W]\right)^{\frac{1}{3}}$$

$$b = \left(\frac{16 + CLUT\min}{116}\right)\left(\left(\frac{32768}{65535}\right)[X_W|Y_W|Z_W]\right)^{\frac{1}{3}}$$

$$c = \frac{294912}{532777705}(CLUT\max - CLUT\min)[X_W|Y_W|Z_W]$$

$$d = -\frac{CLUT\min - 8}{CLUT\max - CLUT\min}$$

$$e = 0$$

$$f = \frac{294912}{532777705}CLUT\min[X_W|Y_W|Z_W]$$

A routine to evaluate these parameters for given CLUTmax, CLUTmin, and white point XYZ can be as follows:

$McurveFunc[CLUT\max\_, \ CLUT\min\_, \ \{X\_, Y\_, Z\_\}] :=$ $\text{Module}\Big[\{a, b, c, d, e, f\},$ $$a = \left\{\left(\frac{(CLUT\max - CLUT\min)}{116}\right)\left(\frac{32768}{65535}\right)X\right)^{\frac{1}{3}},$$

$$\left(\frac{(CLUT\max = CLUT\min)}{116}\right)\left(\frac{32768}{65535}\right)Y\right)^{\frac{1}{3}},$$

$$\left(\frac{(CLUT\max - CLUT\min)}{116}\right)\left(\frac{32768}{65535}\right)Z\right)^{\frac{1}{3}}\right\};$$

Print["a =", N[a]];

$b =$ $$\left\{\left(\frac{16 + CLUT\min}{116}\right)\left(\frac{32768}{65535}\right)X\right)^{\frac{1}{3}}, \left(\frac{16 + CLUT\min}{116}\right)\left(\frac{32768}{65535}\right)Y\right)^{\frac{1}{3}},$$

$$\left(\frac{16 + CLUT\min}{116}\right)\left(\frac{32768}{65535}\right)Z\right)^{\frac{1}{3}}\right\};$$

Print["b =", N[b]];

$$c = \left\{\frac{294912}{532777705}(CLUT\max - CLUT\min)(X),\right.$$

$$\frac{294912}{532777705}(CLUT\max - CLUT\min)(Y),$$

$$\left.\frac{294912}{532777705}(CLUT\max - CLUT\min)(Z)\right\};$$

Print["c =", N[c]];

$$d = \left\{\frac{CLUT\min - 8}{CLUT\max - CLUT\min}\right\};$$

Print["d =", N[d]];

Print["e =", 0];

$$f = \left\{\frac{294912}{532777705}CLUT\min(X),\right.$$

$$\frac{294912}{532777705}CLUT\min(Y),$$

$$\left.\frac{294912}{532777705}CLUT\min(Z)\right\};$$

-continued

Print["f =", N[f]];

Print[N[{a, b, c, d, {0, 0, 0}, f}]];

Print["in hex:"];

Print[BaseForm[

MatrixForm[Round[{a, b, c, d, {0, 0, 0}, f * 65536.0}], 16]];

Print[MatrixForm[N[Round[{a, b, c, d{0, 0, 0}f} * 65536.0] / 65536.0]];]

For the ICC PCS D50 Lab case:
McurveFunc [174.24, −73.66, {0.9642, 1.0, 0.8249}]
a={1.67571, 1.6962, 1.59078}
b={−0.389761, −0.394526, −0.370006}
c={0.132309, 0.137222, 0.113194}
d={0.329407}
e=0
f=[−0.0393138, −0.0407735, −0.0336341]
{{1.67571, 1.6962, 1.59078},
{−0.389761, −0.394526, −0.370006},
{0.132309, 0.137222, 0.113194}, {0.329407},
{0., 0., 0.}, {−0.0393138, −0.0407735, −0.0336341}}
in hex:

$$\begin{pmatrix} \{1acfc_{16}, 1b23a_{16}, 1973e_{16}\} \\ \{-63c7_{16}, -6500_{16}, -5eb9_{16}\} \\ \{21df_{16}, 2321_{16}, 1cfa_{16}\} \\ \{5454_{16}\} \\ \{0_{16}, 0_{16}, 0_{16}\} \\ \{-a10_{16}, -a70_{16}, -89c_{16}\} \end{pmatrix}$$

dec from hex:

$$\begin{pmatrix} \{1.67572, 16962, 1.59079\} \\ \{-0.389755, -0.394531, -0.37001\} \\ \{0.132309, 0.137222, 0.11319\} \\ \{0.329407\} \\ \{0., 0., 0.\} \\ \{-0.0393066, -0.0407715, -0.0336304\} \end{pmatrix}$$

negative hex terms:
$-63c7_{16}$=0xFFFF9C39,$-6500_{16}$=0xFFFF9B00,
$-5eb9_{16}$=0xFFFFF5F0,
$-a10_{16}$=0xFFFFF5F0,
$-a70_{16}$=0xFFFFF590,$-89c_{16}$=0xFFFFF764 where, $\gamma$=3.0=0x00030000.

For the A2B1 tag, the matrix is an identity matrix with 0,0,0 offsets. For the A2B0 tag, the matrix is non-identity as it handles the perceptual black point. If this profile has a D50 white point, there is no chromatic adaptation to be handled in the matrices. Here's the formulation for the matrix to handle the perceptual black point:

$$\begin{pmatrix} e_1 & e_2 & e_3 \\ e_4 & e_5 & e_6 \\ e_7 & e_8 & e_9 \end{pmatrix} + \begin{pmatrix} e_{10} \\ e_{11} \\ e_{12} \end{pmatrix} \rightarrow$$

-continued $$\left(\left(\begin{pmatrix} 1-\frac{X_{bperc}}{X_{Wpcs}} & 0 & 0 \\ 0 & \left(1-\frac{Y_{bperc}}{Y_{wpcs}}\right) & 0 \\ 0 & 0 & \left(1-\frac{Z_{bperc}}{Z_{wpcs}}\right) \end{pmatrix}\right) \cdot chad + \begin{pmatrix} X_{bperc} \\ Y_{bperc} \\ Z_{bperc} \end{pmatrix}\right) \text{ with}$$

$$\begin{pmatrix} X_{wpcs} \\ Y_{wpcs} \\ Z_{wpcs} \end{pmatrix} = \begin{pmatrix} 0.9642 \\ 1.0000 \\ 0.8249 \end{pmatrix} \text{ and } \begin{pmatrix} X_{bperc} \\ Y_{bperc} \\ Z_{bperc} \end{pmatrix} = \begin{pmatrix} 0.00336 \\ 0.0034731 \\ 0.00287 \end{pmatrix} \text{ giving}$$

$$\left(\begin{pmatrix} 0.996515 & 0 & 0 \\ 0 & 0.996527 & 0 \\ 0 & 0 & 0.996521 \end{pmatrix} \cdot chad + \begin{pmatrix} 0.00336 \\ 0.0034731 \\ 0.00287 \end{pmatrix}\right)$$

As this profile for the ICC PCS has a D50 white point, the chad is an identify matrix:

$$\begin{pmatrix} 0.996515 & 0 & 0 \\ 0 & 0.996527 & 0 \\ 0 & 0 & .996521 \end{pmatrix} \cdot \begin{pmatrix} 1 & 0 & 0 \\ 0 & 1 & 0 \\ 0 & 0 & 1 \end{pmatrix} \cdot \begin{pmatrix} 0.00336 \\ 0.0034731 \\ 0.00287 \end{pmatrix}$$

so the matrix and offsets are:

$$\begin{pmatrix} 0.996515 & 0 & 0 \\ 0 & 0.996527 & 0 \\ 0 & 0 & 0.996521 \end{pmatrix} + \begin{pmatrix} 0.00336 \\ 0.0034731 \\ 0.00287 \end{pmatrix}$$

and in hex this is:

$$\begin{pmatrix} 0000FF1B & 00000000 & 00000000 \\ 00000000 & 0000FF1C & 00000000 \\ 00000000 & 00000000 & 0000FF1B \end{pmatrix} + \begin{pmatrix} 000000DC \\ 000000E1 \\ 000000BC \end{pmatrix}$$

For the A2B1 tag, there is no perceptual black point to account to deal with, so the matrix and offsets can be:

$$\begin{pmatrix} 1 & 0 & 0 \\ 0 & 1 & 0 \\ 0 & 0 & 1 \end{pmatrix} + \begin{pmatrix} 0 \\ 0 \\ 0 \end{pmatrix}$$

in hex:

$$\begin{pmatrix} 00010000 & 00000000 & 00000000 \\ 00000000 & 00010000 & 00000000 \\ 00000000 & 00000000 & 00010000 \end{pmatrix} + \begin{pmatrix} 00000000 \\ 00000000 \\ 00000000 \end{pmatrix}$$

A-Curves and B-Curves can both be identity curveType tags, identified by a 0 count field.

FIG. 9 illustrates creation of a transform-defining element according to another implementation. A first processing stage that accounts for the range of a parameterized color space is determined at 900. A second processing stage that accounts for the offset of the parameterized color space and defines at least a portion of a conversion of the image color space to a chromatic adaptation color space is determined at 910. A third processing stage that defines a chromatic adaptation according to the white point of the parameterized color space is determined at 920. The transform-defining element illustrated in FIG. 7 can be used. Thus, mapping of non-canonical ranges and channel bit depths can be defined in a three dimensional interpolation table stage of the transform-defining element 450, mapping of non-canonical offsets can be defined in the one dimensional transforms, and non-canonical white points can be compensated for in a matrix stage of the transform-defining element 450.

In the context of constructing an ICC v4 profile with a CIEXYZ PCS, the invention can combine the conversion from a non-canonical CIELAB encoding with the conversion from CIELAB to the CIEXYZ D50 PCS, as follows, resulting in color profiles that are independent of the data channel bit depths. In an ICC v4 profile with a CIEXYZ PCS, the lutA-toBtags can be constructed to implement the CIELAB to XYZ conversion as above, but with non-canonical offsets being delayed into the M curves rather than being applied in the matrix used in constructing the CLUT. The input and output of the CLUT can use the full range, 0 . . . 1, for maximum precision. This results in improved accuracy.

The CLUT entries can be made positive by negating the incoming CIELAB B channel (1−B) and swapping the rows in the CLUT that have a 1 in the B channel with those that have a 0 in the B channel. As before, the M curves can be three type-4 parametricCurveType tags of the form:

$$y=(ax+b)^\gamma+e \text{ for } x \geq d \text{ and } y=(cx+f) \text{ for } x<d \quad (33)$$

These curves can denormalize the output from the CLUT, apply the nonlinear function of the CIELAB to XYZ conversion, and apply the non-canonical channel offsets. The input and output of the M curves can use the full range, 0 . . . 1, for maximum precision. By arranging the operations appropriately, the data used in making the CLUT can be more linearly related, and thus linear interpolation with the CLUT produces minimal interpolation errors.

Additionally, a chad can be constructed for the illuminant specified in the non-canonical CIELAB parameterization, and this chad matrix can be used in the construction of the matrix stage of the lutAtoBtype tag in ICC. The constructed matrix stage can denormalize the M-curve output, multiply by the LAB space white point XYZ, scale by 32768/65535, and apply the adaptation from the parameterized CIELAB illuminant to the PCS D50 illuminant. Moreover, in the case of using the perceptual intent (one of the rendering intents available during gamut mapping), the constructed matrix stage for an AToB tag can map the parameterized CIELAB's black point to the ICC perceptual intent black.

The following description provides a derivation of JPX parameterized LAB profile elements to further illustrate the description above. Conversion of CIELAB to XYZ can be performed via the following equations:

$$X = X_w * f\left[\frac{(L+16)}{116} + \frac{a}{500}\right]$$

$$Y = Y_w * f\left[\frac{(L+16)}{116}\right]$$

$$Z = Z_w * f\left[\frac{L+16}{116} - \frac{b}{200}\right]$$

where $X_W$, $Y_W$, $Z_W$ are the tristimulous values of the white point and $$f[x] = x^3 \text{ for } x \geq \frac{6}{29},$$

$$f[x] = \frac{108}{841}\left(x - \frac{4}{29}\right) \text{ for } x < \frac{6}{29}.$$

In term of the current ranges and offsets, these become:
For X $$X = X_W * f\left[\frac{R_L(L_{in} - O_{Ln}) + 16}{116} + \frac{R_a(a_{in} - O_{an})}{500}\right]$$

$$X = X_W f\left[\frac{4}{29} + \frac{R_L}{116}(L_{in} - O_{Ln}) + \frac{R_a}{500}(a_{in} - O_{an})\right]$$

where:
$L_{in}$, $a_{in}$, $b_{in}$ are the jpx encoded Lab values
$R_L$, $R_a$, $R_b$ are the jpx ranges for Lab (note that these are in Lab units)
$O_L$, $O_a$, $O_b$ are the jpx Lab channel offsets
$n_L$, $n_a$, $n_b$ are the jpx Lab or original encoding bit-depths
normalized offsets $$O_{Ln} = \frac{O_L}{(2^{n_L} - 1)}$$

$$O_{an} = \frac{O_a}{(2^{n_a} - 1)}$$

$$O_{bn} = \frac{O_b}{(2^{n_b} - 1)}$$

This can be rearranged to:

$$X = X_w f\left[\frac{R_L}{116} L_{in} + \frac{R_a}{500} a_{in} + \left(\frac{4}{29} - \frac{R_L}{116} O_{Ln} - \frac{R_a}{500} O_{an}\right)\right]$$

in terms of the current notation:

$$X = X_W f\left[S_L L_{in} + S_a a_{in} + \left(\frac{4}{29} - S_L O_{Ln} - S_a O_{an}\right)\right]$$

where $S_L = \frac{R_L}{116}, S_a = \frac{R_a}{500}, S_b = \frac{R_b}{200}, S_x = S_L + S_a,$ $S_y = S_L, S_z = S_L + S_b, O_x = O_{Ln} * S_L + O_{an} * S_a,$ $O_y = O_{Ln} * S_L, O_z = O_{Ln} * S_L + (1 - O_{bn}) * S_b.$ For Y:

$$Y = Y_W * f\left[\frac{(R_L(L_{in} - O_{Ln}) + 16)}{116}\right]$$

which can be rearranged to:

$$Y = Y_W * f\left[\frac{R_L}{116} L_{in} + \left(\frac{4}{29} - \frac{R_L}{116} O_{Ln}\right)\right]$$

in terms of the current notation:

$$Y = Y_W * f\left[S_L L_{in} + \left(\frac{4}{29} - S_L O_{Ln}\right)\right]$$

For Z:

$$Z = Z_W * f\left[\frac{(R_L(L_{in} - O_{Ln}) + 16)}{116} - \frac{R_b(b_{in} - O_{bn})}{200}\right]$$

this can be rearranged to:

$$Z = Z_W * f\left[\frac{R_L}{116} L_{in} - \frac{R_L}{116} O_{Ln} + \frac{16}{116} - \frac{R_b}{200} b_{in} + \frac{R_b}{200} O_{bn}\right]$$

further to:

$$Z = Z_W * f\left[\frac{R_L}{116} L_{in} - \frac{R_b}{200} b_{in} + \left(\frac{4}{29} - \frac{R_L}{116} O_{Ln} + \frac{R_b}{200} O_{bn}\right)\right]$$

in terms of the current notation:

$$Z = Z_W * f\left[S_L L_{in} - S_b b_{in} + \left(\frac{4}{29} - S_L O_{Ln} + S_b O_{bn}\right)\right]$$

These 3 equations result in the following matrix and offset form:

$$X = X_W f\left[S_L L_{in} + S_a a_{in} + \left(\frac{4}{29} - S_L O_{Ln} - S_a O_{an}\right)\right]$$

$$Y = Y_W * f\left[S_L L_{in} + \left(\frac{4}{29} - S_L O_{Ln}\right)\right]$$

$$Z = Z_W * f\left[S_L L_{in} - S_b b_{in} + \left(\frac{4}{29} - S_L O_{Ln} + S_b O_{bn}\right)\right]$$

matrix:

$$\begin{pmatrix} S_L & S_a & 0 \\ S_L & 0 & 0 \\ S_L & 0 & -S_b \end{pmatrix}$$

If any b input is replaced with (1−b), the result is a positive matrix:

$$\begin{pmatrix} S_L & S_a & 0 \\ S_L & 0 & 0 \\ S_L & 0 & S_b \end{pmatrix}$$

normalized matrix:

$$\begin{pmatrix} \frac{S_L}{S_x} & \frac{S_a}{S_x} & 0 \\ \frac{S_L}{S_y} & 0 & 0 \\ \frac{S_L}{S_z} & 0 & \frac{S_b}{S_z} \end{pmatrix}$$

Offsets vector:

$$\begin{pmatrix} \frac{4}{29} - O_{an}S_a - O_{Ln}S_L \\ \frac{4}{29} - O_{Ln}S_L \\ \frac{4}{29} + O_{bn}S_b - O_{Ln}S_L \end{pmatrix}$$

This matrix gives the following CLUT:

in    CLUT $$\begin{pmatrix} 0 & 0 & 0 \\ 0 & 0 & 1 \\ 0 & 1 & 0 \\ 0 & 1 & 1 \\ 1 & 0 & 0 \\ 1 & 0 & 1 \\ 1 & 1 & 0 \\ 1 & 1 & 1 \end{pmatrix} \begin{pmatrix} 0 & 0 & 0 \\ 0 & 0 & \frac{S_b}{S_z} \\ \frac{S_a}{S_x} & 0 & 0 \\ \frac{S_a}{S_x} & 0 & \frac{S_b}{S_z} \\ \frac{S_L}{S_x} & \frac{S_L}{S_y} & \frac{S_L}{S_z} \\ \frac{S_L}{S_x} & \frac{S_L}{S_y} & \frac{S_L + S_b}{S_z} \\ \frac{S_L}{S_x} & \frac{S_L}{S_y} & \frac{S_L}{S_z} \\ \frac{S_L + S_a}{S_x} & \frac{S_L}{S_y} & \frac{S_L}{S_z} \\ \frac{S_L + S_a}{S_x} & \frac{S_L}{S_y} & \frac{S_L + S_b}{S_z} \end{pmatrix}$$

Using (1−b) instead of b can be compensated for by swapping rows with zero and one in the third input column:

$$\begin{pmatrix} 0 & 0 & 0 \\ 0 & 0 & 1 \\ 0 & 1 & 0 \\ 0 & 1 & 1 \\ 1 & 0 & 0 \\ 1 & 0 & 1 \\ 1 & 1 & 0 \\ 1 & 1 & 1 \end{pmatrix} \begin{pmatrix} 0 & 0 & \frac{S_b}{S_z} \\ 0 & 0 & 0 \\ \frac{S_a}{S_x} & 0 & \frac{S_b}{S_z} \\ \frac{S_a}{S_x} & 0 & 0 \\ \frac{S_L}{S_x} & \frac{S_L}{S_y} & \frac{S_L + S_b}{S_z} \\ \frac{S_L}{S_x} & \frac{S_L}{S_y} & \frac{S_L}{S_z} \\ \frac{S_L + S_a}{S_x} & \frac{S_L}{S_y} & \frac{S_L + S_b}{S_z} \\ \frac{S_L + S_a}{S_x} & \frac{S_L}{S_y} & \frac{S_L}{S_z} \end{pmatrix}$$

Noting that $$\frac{S_L}{S_y} = 1,$$

$S_L + S_a = S_x$, and $S_L + S_b = S_z$, the resulting CLUT is:

$$\begin{pmatrix} 0 & 0 & 0 \\ 0 & 0 & 1 \\ 0 & 1 & 0 \\ 0 & 1 & 1 \\ 1 & 0 & 0 \\ 1 & 0 & 1 \\ 1 & 1 & 0 \\ 1 & 1 & 1 \end{pmatrix} \begin{bmatrix} 0 & 0 & \frac{S_b}{S_z} \\ 0 & 0 & 0 \\ \frac{S_a}{S_x} & 0 & \frac{S_b}{S_z} \\ \frac{S_a}{S_x} & 0 & 0 \\ \frac{S_L}{S_x} & 1 & 1 \\ \frac{S_L}{S_x} & 1 & \frac{S_L}{S_z} \\ 1 & 1 & 1 \\ 1 & 1 & \frac{S_L}{S_z} \end{bmatrix}$$

with offsets:

$$\begin{pmatrix} \frac{4}{29} - O_{an}S_a - O_{Ln}S_L \\ \frac{4}{29} - O_{Ln}S_L \\ \frac{4}{29} + O_{bn}S_b - O_{Ln}S_L \end{pmatrix}$$

Recalling that $O_x = O_{Ln}*S_L + O_{an}*S_a$ $O_y = O_{Ln}*S_L$ $O_z = O_{Ln}*S_L + (1-O_{bn})*S_b \rightarrow O_z = O_{Ln}*S_L - O_{bn}S_b + S_b$ the offset vector can be rewritten as:

$$\begin{pmatrix} \frac{4}{29} - (O_{an}S_a + O_{Ln}S_L) \\ \frac{4}{29} - O_{Ln}S_L \\ \frac{4}{29} - O_{Ln}S_L - O_{bn}S_b \end{pmatrix}$$

substituting the $O_{xyz}$ (note: $(O_{Ln}S_L - O_{bn}S_b) = O_z - S_b$):

$$\begin{pmatrix} \frac{4}{29} - O_x \\ \frac{4}{29} - O_y \\ \frac{4}{29} - (O_z - S_b) \end{pmatrix}$$

giving the offset vector as:

$$\begin{matrix} O'_x = \\ O'_y = \\ O'_z = \end{matrix} \begin{pmatrix} \frac{4}{29} - O_x \\ \frac{4}{29} - O_y \\ \frac{4}{29} + S_b - O_z \end{pmatrix}$$

The M-curves can denormalize the output of the CLUT, apply the offsets $O'_{xyz}$, and apply the function f from the Lab to XYZ conversion:

$$f[x] = x^3 \text{ for } x \geq \frac{6}{29}$$

$$f[x] = \frac{108}{841}\left(x - \frac{4}{29}\right) \text{ for } x < \frac{6}{29}$$

As before, the M-curves can be type 4 parametric curves of the form: $y=(ax+b)^\gamma + e$ for $(x \geq d)$, and $y=(cx+f)$ for $(x<d)$. The general form for the m-curves can be:

$$\text{If } \left(T_n \geq \frac{6}{29}\right) U_n = T_n^3 \text{ else } U_n = \frac{108}{841}\left(T_n - \frac{4}{29}\right)$$

The m-curves can be normalized so that output is on [0 ... 1] by dividing by the max value of $U_n$: max $U_n = T_n^3 = (S_n + O'_n)^3$. So for the channel 1 curve:

$$T_x = X * S_x + O'_x$$

$$\text{If } \left((X*S_x + O'_x) \geq \frac{6}{29}\right) \rightarrow$$

$$\text{If } \left(X*S_x \geq \left(\frac{6}{29} - O'_x\right)\right) \rightarrow \text{If } \left(X \geq \frac{\frac{6}{29} - O'_x}{S_x}\right) U_x =$$

-continued $$\frac{(X*S_x + O'_x)^3}{(S_x + O'_x)^3} \rightarrow \left(\frac{X*S_x}{S_x + O'_x} + \frac{O'_x}{S_x + O'_x}\right)^3 \text{ else}$$

$$U_x = \frac{\frac{108}{841}\left(X*S_x + O'_x - \frac{4}{29}\right)}{(S_x + O'_x)^3} \rightarrow \frac{\frac{108}{841}S_x X}{(S_x + O'_x)^3} + \frac{\frac{108}{841}\left(O'_x - \frac{4}{29}\right)}{(S_x + O'_x)^3}$$

This results in type 4 parametric curve parameters as follows:

$$\gamma_x = 3$$

$$a_x = \frac{S_x}{S_x + O'_x} \rightarrow \frac{S_x}{\frac{4}{29} + S_x - O_x}$$

$$b_x = \frac{O'_x}{S_x + O'_x} \rightarrow \frac{\frac{4}{29} - O_x}{\frac{4}{29} + S_x - O_x}$$

$$c_x = \frac{\frac{108}{841}S_x}{(S_x + O'_x)^3} \rightarrow \frac{\frac{108}{841}S_x}{\left(\frac{4}{29} + S_x - O_x\right)^3}$$

$$d_x = \frac{\frac{6}{29} - O'_x}{S_x} \rightarrow \frac{\frac{6}{29} - \left(\frac{4}{29} - O_x\right)}{S_x} \rightarrow \frac{\frac{2}{29} + O_x}{S_x}$$

$$e_x = 0$$

$$f_x = \frac{\frac{108}{841}\left(O'_x - \frac{4}{29}\right)}{(S_x + O'_x)} \rightarrow \frac{\frac{108}{841}\left(\left(\frac{4}{29} - O_x\right) - \frac{4}{29}\right)}{\left(\frac{4}{29} + S_x - O_x\right)^3} \rightarrow \frac{-\frac{108}{841}O_x}{\left(\frac{4}{29} + S_x - O_x\right)^3}$$

similarly for channel 2:

$$\gamma_Y = 3$$

$$a_Y = \frac{S_Y}{S_Y + (O')_Y} \rightarrow \frac{S_Y}{\frac{4}{29} + S_Y - O_Y}$$

$$b_Y = \frac{O'_Y}{S_Y + O'_Y} \rightarrow \frac{\frac{4}{29} - O_Y}{\frac{4}{29} + S_Y - O_y}$$

$$c_Y = \frac{\frac{108}{841}S_Y}{(S_Y + O'_Y)^3} \rightarrow \frac{\frac{108}{841}S_Y}{\left(\frac{4}{29} + S_Y - O_y\right)^3}$$

$$d_Y = \frac{\frac{6}{29} - O'_Y}{S_Y} \rightarrow \frac{\frac{6}{29} - \left(\frac{4}{29} - O_Y\right)}{S_Y} \rightarrow \frac{\frac{2}{29} + O_Y}{S_Y}$$

$$e_Y = 0$$

$$f_Y = \frac{\frac{108}{841}\left(O'_Y - \frac{4}{29}\right)}{(S_Y + O'_Y)} \rightarrow \frac{\frac{108}{841}\left(\left(\frac{4}{29} - O_Y\right) - \frac{4}{29}\right)}{\left(\frac{4}{29} + S_Y - O_Y\right)^3} \rightarrow -\frac{\frac{108}{841}O_Y}{\left(\frac{4}{29} + S_Y - O_Y\right)^3}$$

and for channel 3:

$\gamma_z = 3$ $a_z = \dfrac{S_z}{S_z + O'_z} \rightarrow \dfrac{S_z}{\dfrac{4}{29} + S_z + S_b - O_z}$ $b_z = \dfrac{O'_z}{S_z + O'_z} \rightarrow \dfrac{\dfrac{4}{29} - O_z}{\dfrac{4}{29} + S_z + S_b - O_z}$ $c_z = \dfrac{\dfrac{108}{841} S_z}{(S_z + O'_z)^3} \rightarrow \dfrac{\dfrac{108}{841} S_z}{\left(\dfrac{4}{29} + S_z + S_b - O_z\right)^3}$ $d_z = \dfrac{\dfrac{6}{29} - O'_z}{S_z} \rightarrow \dfrac{\dfrac{6}{29} - \left(\dfrac{4}{29} + S_b - O_z\right)}{S_z} \rightarrow \dfrac{\dfrac{2}{29} + O_z - S_b}{S_z}$ $e_z = 0$ $f_z = \dfrac{\dfrac{108}{841}\left(O'_z - \dfrac{4}{29}\right)}{(S_z + O'_z)^3} \rightarrow \dfrac{\dfrac{108}{841}\left(\left(\dfrac{4}{29} + S_b - O_z\right) - \dfrac{4}{29}\right)}{\left(\dfrac{4}{29} + S_z + S_b - O_z\right)^3} \rightarrow$ $\dfrac{\dfrac{108}{841}(S_b - O_z)}{\left(\dfrac{4}{29} = S_z + S_b - O_z\right)^3}$ For the matrix stage:

$\begin{pmatrix} e_1 & e_2 & e_3 \\ e_4 & e_5 & e_6 \\ e_7 & e_8 & e_9 \end{pmatrix} + \begin{pmatrix} e_{10} \\ e_{11} \\ e_{12} \end{pmatrix}$ The matrix denormalizes the output from the m-curves, multiplies by $XYZ_W$ and scales by $\dfrac{32768}{65535}$, and applies the chromatic adaptation via the chad: rel col matrix=chad.scalingMatrix, where the Scaling Matrix is:

$\begin{pmatrix} \dfrac{32768}{655535} X_W \left(\left(\dfrac{4}{29} + S_X - O_X\right)^3\right) & 0 & 0 \\ 0 & \dfrac{32768}{65535} Y_W \left(\left(\dfrac{4}{29} + S_Y - O_Y\right)^3\right) & 0 \\ 0 & 0 & \dfrac{32768}{65535} Z_W \left(\left(\dfrac{4}{29} + S_z + S_b - O_z\right)^3\right) \end{pmatrix}$ The relative colorimetric offset vector = $\begin{pmatrix} 0 \\ 0 \\ 0 \end{pmatrix}$.

Perceptual Matrix=PercBPScalingMatrix.rel col matrix.

$PercBPScalingMatrix = \begin{pmatrix} \left(1 - \dfrac{X_{bperc}}{X_{wpcs}}\right) & 0 & 0 \\ 0 & \left(1 - \dfrac{Y_{bperc}}{Y_{wpcs}}\right) & 0 \\ 0 & 0 & \left(1 - \dfrac{Z_{bperc}}{Z_{wpcs}}\right) \end{pmatrix}$ Perceptual offset vector =

$\begin{pmatrix} \dfrac{32768}{65535} X_{bperc} \\ \dfrac{32768}{65535} Y_{bperc} \\ \dfrac{32768}{65535} Z_{bperc} \end{pmatrix}$ with $\begin{pmatrix} X_{wpcs} \\ Y_{wpcs} \\ Z_{wpcs} \end{pmatrix} = \begin{pmatrix} 0.9642 \\ 1.0000 \\ 0.8249 \end{pmatrix}$ and $\begin{pmatrix} X_{bperc} \\ Y_{bperc} \\ Z_{bperc} \end{pmatrix} * \left(\dfrac{32768}{65535}\right) =$ $\begin{pmatrix} 0.00336 \\ 0.0034731 \\ 0.00287 \end{pmatrix} * \left(\dfrac{32768}{65535}\right) = \begin{pmatrix} 0.00168003 \\ 0.00173658 \\ 0.00143502 \end{pmatrix}$ The invention and all of the functional operations described in this specification can be implemented in digital electronic circuitry, or in computer hardware, firmware, software, or in combinations of them, such as the structural means disclosed in this specification and structural equivalents thereof. Apparatus of the invention can be implemented in a software product (e.g., a computer program product) tangibly embodied in a machine-readable storage device for execution by a programmable processor; and processing operations of the invention can be performed by a programmable processor executing a program of instructions to perform functions of the invention by operating on input data and generating output. The invention can be implemented advantageously in one or more software programs that are executable on a programmable system including at least one programmable processor coupled to receive data and instructions from, and to transmit data and instructions to, a data storage system, at least one input device, and at least one output device. Each software program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory, a random access memory and/or a machine-readable signal (e.g., a digital signal received through a network connection). Generally, a computer will include one or more mass storage devices for storing data files; such devices include magnetic disks, such as internal hard disks and removable disks, magneto-optical disks, and optical disks. Storage devices suitable for tangibly embodying software program instructions and data include all forms of non-volatile memory, including by way of example semiconductor memory devices, such as EPROM (electrically programmable read-only memory), EEPROM (electrically erasable programmable read-only memory), and flash memory devices; magnetic disks such as internal hard disks and removable disks; magneto-optical disks; and optical disks, such as CD-ROM disks. Any of the foregoing can be supplemented by, or incorporated in, ASICs (application-specific integrated circuits).

To provide for interaction with a user, the invention can be implemented on a computer system having a display device such as a monitor or LCD (liquid crystal display) screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the systems and techniques described can be applied to other color spaces, such as the YCC (Luma-Chroma-Chroma) color space. Moreover, other defined color profile architectures and transform-defining elements can be used, such as a CSA (color space array) and a CRD (color rendering dictionary) in the PostScript® language. The operations of the invention can be performed in a different order and still achieve desirable results.

What is claimed is:

1. A machine-implemented method comprising:
generating a color profile that conforms to a defined color profile architecture and that defines a multistage transform capable of translating an image color space to a profile connection color space;
receiving an image;
processing the image using the color profile; and
outputting the image to an electronic device; wherein the generating, the receiving, the processing and the outputting are performed by at least one processor, and wherein the image comprises a parameterized encoding of the image color space with image parameters defining a range and an offset of an image component of the image, and a white point of the image color space; and
the generating the color profile comprises affecting two or more stages of the multistage transform based on the image parameters during the generating of the color profile, the affecting comprising:
determining a first processing stage of a transform-defining element of the defined color profile architecture, wherein the first processing stage comprises a multidimensional interpolation table that governs commingling of image channels and accounts for the range and the offset, and wherein the determining the first processing stage comprises making entries of the multidimensional interpolation table positive and normalizing the entries in the multidimensional interpolation table;
determining a second processing stage of the transform-defining element, wherein the second processing stage comprises one dimensional transforms and defines at least a portion of a conversion of the image color space to a chromatic adaptation color space, and wherein the determining the second processing stage comprises generating a second processing stage that denormalizes output of the first processing stage, applies a nonlinear function and scales by a scaling factor; and
determining a third processing stage of the transform-defining element, wherein the third processing stage comprises a matrix and defines a chromatic adaptation in the chromatic adaptation color space according to the white point, and wherein the determining the third processing stage comprises generating a third processing stage that denormalizes output of the second processing stage and performs the chromatic adaptation.

2. The method of claim 1, wherein the generating the color profile further comprises increasing image processing precision by fitting output to input data scopes between two or more stages of the multistage transform based on the parameterized encoding of the image.

3. The method of claim 2, wherein the generating the color profile further comprises affecting stages of the multistage transform such that the color profile transcodes the image component according to the range and the offset; and the fitting comprises fitting output to input data scopes among the stages.

4. The method of claim 3, wherein the image parameters of the parameterized encoding define ranges, offsets, and bit depths of image components of the image, and the color profile comprises a bit-depth independent color profile.

5. The method of claim 2, wherein the affecting the two or more stages comprises taking into account at least a portion of the image parameters within a middle stage of a transform-defining element of the defined color profile architecture, the transform-defining element comprising at least three stages and at most five stages.

6. The method of claim 5, wherein the image color space comprises a CIELAB color space, and the profile connection space comprises a CIEXYZ color space.

7. The method of claim 6, wherein the defined color profile architecture comprises an International Color Consortium color profile architecture, and the transform-defining element comprises a lutAtoB tag.

8. The method of claim 1, wherein the multidimensional interpolation table comprises a 2×2×2 multidimensional interpolation table, and the third processing stage also maps a black point of the image color space to a perceptual intent black of the defined color profile architecture.

9. The method of claim 1, wherein the processing the image using the color profile comprises embedding the color profile in the image, and the outputting the image comprises saving the image to a storage device.

10. The method of claim 1, wherein the processing the image using the color profile comprises transforming the image from the image color space to a working color space, and the outputting the image comprises saving the image to a memory device.

11. A machine-implemented method comprising:
generating a color profile that conforms to a defined color profile architecture and that defines a multistage transform capable of translating an image color space to a profile connection color space;
receiving an image;
processing the image using the color profile; and outputting the image to an electronic device; wherein the generating, the receiving, the processing and the outputting are performed by at least one processor, and wherein the image comprises a parameterized encoding of the image color space with image parameters defining a range and an offset of an image component of the image, and a white point of the image color space; and the generating the color profile comprises affecting two or more stages of the multistage transform based on the image parameters during the generating of the color profile, the affecting comprising:

determining a first processing stage of a transform-defining element of the defined color profile architecture, wherein the first processing stage comprises a multidimensional interpolation table that governs commingling of image channels and accounts for the range, and wherein the determining the first processing stage comprises negating a channel of the image color space and swapping rows in the multidimensional interpolation table having a 1 in the channel with rows in the multidimensional interpolation table having a 0 in the channel;

determining a second processing stage of the transform-defining element, wherein the second processing stage comprises one dimensional transforms and accounts for the offset and defines at least a portion of a conversion of the image color space to a chromatic adaptation color space, and wherein the determining the second processing stage comprises generating a second processing stage that applies a nonlinear function and applies the offset; and determining a third processing stage of the transform-defining element, wherein the third processing stage comprises a matrix and defines a chromatic adaptation in the chromatic adaptation color space according to the white point, and wherein the determining the third processing stage comprises generating a third processing stage that denormalizes output of the second processing stage and performs the chromatic adaptation.

12. The method of claim 11, wherein the multidimensional interpolation table comprises a 2×2×2 multidimensional interpolation table, and the third processing stage also maps a black point of the parameterized color space to a perceptual intent black of the defined color profile architecture.

13. The method of claim 11, wherein the generating the color profile further comprises increasing image processing precision by fitting output to input data scopes between two or more stages of the multistage transform based on the parameterized encoding of the image.

14. The method of claim 13, wherein the generating the color profile further comprises affecting stages of the multistage transform such that the color profile transcodes the image component according to the range and the offset; and the fitting comprises fitting output to input data scopes among the stages.

15. The method of claim 14, wherein the image parameters of the parameterized encoding define ranges, offsets, and bit depths of image components of the image, and the color profile comprises a bit-depth independent color profile.

16. The method of claim 13, wherein the affecting the two or more stages comprises taking into account at least a portion of the image parameters within a middle stage of a transform-defining element of the defined color profile architecture, the transform-defining element comprising at least three stages and at most five stages.

17. The method of claim 16, wherein the image color space comprises a CIELAB color space, and the profile connection space comprises a CIEXYZ color space.

18. The method of claim 17, wherein the defined color profile architecture comprises an International Color Consortium color profile architecture, and the transform-defining element comprises a lutAtoB tag.

19. The method of claim 11, wherein the processing the image using the color profile comprises embedding the color profile in the image, and the outputting the image comprises saving the image to a storage device.

20. The method of claim 11, wherein the processing the image using the color profile comprises transforming the image from the image color space to a working color space, and the outputting the image comprises saving the image to a memory device.

21. A storage device having a software product tangibly embodied therein, the software product comprising instructions operable to cause one or more data processing apparatus to perform operations comprising:

generating a color profile that conforms to a defined color profile architecture and that defines a multistage transform capable of translating an image color space to a profile connection color space;

receiving an image;

processing the image using the color profile; and outputting the image; wherein the image comprises a parameterized encoding of the image color space with image parameters defining a range and an offset of an image component of the image, and a white point of the image color space; and the generating the color profile comprises affecting two or more stages of the multistage transform based on the image parameters during the generating of the color profile, the affecting comprising:

determining a first processing stage of a transform-defining element of the defined color profile architecture, wherein the first processing stage comprises a multidimensional interpolation table that governs commingling of image channels and accounts for the range and the offset, and wherein the determining the first processing stage comprises making entries of the multidimensional interpolation table positive and normalizing the entries in the multidimensional interpolation table;

determining a second processing stage of the transform-defining element, wherein the second processing stage comprises one dimensional transforms and defines at least a portion of a conversion of the image color space to a chromatic adaptation color space, and wherein the determining the second processing stage comprises generating a second processing stage that denormalizes output of the first processing stage, applies a nonlinear function and scales by a scaling factor; and determining a third processing stage of the transform-defining element, wherein the third processing stage comprises a matrix and defines a chromatic adaptation in the chromatic adaptation color space according to the white point, and wherein the determining the third processing stage comprises generating a third processing stage that denormalizes output of the second processing stage and performs the chromatic adaptation.

22. The storage device of claim 21, wherein the generating the color profile further comprises increasing image processing precision by fitting output to input data scopes between two or more stages of the multistage transform based on the parameterized encoding of the image.

23. The storage device of claim 22, wherein the generating the color profile further comprises affecting stages of the multistage transform such that the color profile transcodes the image component according to the range and the offset; and the fitting comprises fitting output to input data scopes among the stages.

24. The storage device of claim 23, wherein the image parameters of the parameterized encoding define ranges, offsets, and bit depths of image components of the image, and the color profile comprises a bit-depth independent color profile.

25. The storage device of claim 22, wherein the affecting the two or more stages comprises taking into account at least a portion of the image parameters within a middle stage of a transform-defining element of the defined color profile architecture, the transform-defining element comprising at least three stages and at most five stages.

26. The storage device of claim 25, wherein the image color space comprises a CIELAB color space, and the profile connection space comprises a CIEXYZ color space.

27. The storage device of claim 26, wherein the defined color profile architecture comprises an International Color Consortium color profile architecture, and the transform-defining element comprises a lutAtoB tag.

28. The storage device of claim 21, wherein the multidimensional interpolation table comprises a 2×2×2 multidimensional interpolation table, and the third processing stage also maps a black point of the image color space to a perceptual intent black of the defined color profile architecture.

29. The storage device of claim 21, wherein the processing the image using the color profile comprises embedding the color profile in the image, and the outputting the image comprises saving the image to a storage device.

30. The storage device of claim 21, wherein the processing the image using the color profile comprises transforming the image from the image color space to a working color space, and the outputting the image comprises saving the image to a memory device.

31. A storage device having a software product tangibly embodied therein, the software product comprising instructions operable to cause one or more data processing apparatus to perform operations comprising:
    generating a color profile that conforms to a defined color profile architecture and that defines a multistage transform capable of translating an image color space to a profile connection color space;
    receiving an image;
    processing the image using the color profile; and
    outputting the image; wherein
    the image comprises a parameterized encoding of the image color space with image parameters defining a range and an offset of an image component of the image, and a white point of the image color space; and
    the generating the color profile comprises affecting two or more stages of the multistage transform based on the image parameters during the generating of the color profile, the affecting comprising:
        determining a first processing stage of a transform-defining element of the defined color profile architecture, wherein the first processing stage comprises a multidimensional interpolation table that governs commingling of image channels and accounts for the range, and wherein the determining the first processing stage comprises negating a channel of the image color space and swapping rows in the multidimensional interpolation table having a 1 in the channel with rows in the multidimensional interpolation table having a 0 in the channel;
        determining a second processing stage of the transform-defining element, wherein the second processing stage comprises one dimensional transforms and accounts for the offset and defines at least a portion of a conversion of the image color space to a chromatic adaptation color space, and wherein the determining the second processing stage comprises generating a second processing stage that applies a nonlinear function and applies the offset; and
        determining a third processing stage of the transform-defining element, wherein the third processing stage comprises a matrix and defines a chromatic adaptation in the chromatic adaptation color space according to the white point, and wherein the determining the third processing stage comprises generating a third processing stage that denormalizes output of the second processing stage and performs the chromatic adaptation.

32. The storage device of claim 31, wherein the multidimensional interpolation table comprises a 2×2×2 multidimensional interpolation table, and the third processing stage also maps a black point of the parameterized color space to a perceptual intent black of the defined color profile architecture.

33. The storage device of claim 31, wherein the generating the color profile further comprises increasing image processing precision by fitting output to input data scopes between two or more stages of the multistage transform based on the parameterized encoding of the image.

34. The storage device of claim 33, wherein the generating the color profile further comprises affecting stages of the multistage transform such that the color profile transcodes the image component according to the range and the offset; and the fitting comprises fitting output to input data scopes among the stages.

35. The storage device of claim 34, wherein the image parameters of the parameterized encoding define ranges, offsets, and bit depths of image components of the image, and the color profile comprises a bit-depth independent color profile.

36. The storage device of claim 33, wherein the affecting the two or more stages comprises taking into account at least a portion of the image parameters within a middle stage of a transform-defining element of the defined color profile architecture, the transform-defining element comprising at least three stages and at most five stages.

37. The storage device of claim 36, wherein the image color space comprises a CIELAB color space, and the profile connection space comprises a CIEXYZ color space.

38. The storage device of claim 37, wherein the defined color profile architecture comprises an International Color Consortium color profile architecture, and the transform-defining element comprises a lutAtoB tag.

39. The storage device of claim 31, wherein the processing the image using the color profile comprises embedding the color profile in the image, and the outputting the image comprises saving the image to a storage device.

40. The storage device of claim 31, wherein the processing the image using the color profile comprises transforming the image from the image color space to a working color space, and the outputting the image comprises saving the image to a memory device.

41. A system comprising:
a device; and
a data processing machine comprising an input-output interface, an operating system, and a color management software component that generates a bit-depth independent color profile for an image comprising a parameterized encoding of an image color space with image parameters defining ranges, offsets and bit depths of image components of the image, wherein the color management software component generates the color profile by representing a transformation comprising a matrix followed by curves in a pipeline of a defined color profile architecture while increasing processing precision governed by the color profile based on the parameterized encoding, and wherein the color management software component is operable to use the curves to (i) denormalize output of the matrix, apply a nonlinear conversion function and scale by a scaling factor, when non-canonical offsets are applied in the matrix, and otherwise (ii) denormalize output of the matrix, apply a nonlinear conversion function and apply non-canonical offsets.

42. The system of claim 41, wherein the image parameters further define a white point of the image color space, and the transformation comprises the matrix followed by the curves followed by an additional matrix, the additional matrix to denormalize curve output and apply a parameterized chromatic adaptation.

43. The system of claim 42, wherein the color profile effects chromatic adaptation according to the white point and transcodes the image components according to the ranges and the offsets, in at least three stages of the pipeline.

44. The system of claim 43, wherein the color profile transcodes the image components in a multidimensional interpolation table stage and a one dimensional transforms stage of the pipeline, and the color profile effects chromatic adaptation in a matrix stage of the pipeline.

45. The system of claim 41, wherein the device comprises a display integrated with the data processing machine.

46. A machine-implemented method comprising:
improving color accuracy of conversion of an image color space of an image by affecting two or more processing stage definitions of a transform-defining element in a color profile associated with a defined image processing pipeline, based on image parameters, such that the defined image processing pipeline transcodes an image component according to a range and an offset, the two or more processing stage definitions being affected during generation of the color profile, and the affecting comprising defining a mapping of the range and the offset in a multidimensional interpolation table stage of the transform-defining element and fitting output to input data scopes between two of the processing stage definitions, and the image comprising a parameterized encoding of the image color space with the image parameters defining the range and the offset of the image component of the image;
processing, by at least one processor, the image using the defined image processing pipeline; and
outputting the processed image to an electronic device;
wherein the affecting comprises:
determining a first processing stage by making entries of the multidimensional interpolation table positive and normalizing the entries in the multidimensional interpolation table;
generating a second processing stage that denormalizes output of the first processing stage, applies a nonlinear function and scales by a scaling factor; and
generating a third processing stage that denormalizes output of the second processing stage and performs the chromatic adaptation.

47. A storage device having a software product tangibly embodied therein, the software product comprising instructions operable to cause one or more data processing apparatus to perform operations comprising:
improving color accuracy of conversion of an image color space of an image by affecting two or more processing stage definitions of a transform-defining element in a color profile associated with a defined image processing pipeline, based on image parameters, such that the defined image processing pipeline transcodes an image component according to a range and an offset, the two or more processing stage definitions being affected during generation of the color profile, and the affecting comprising defining a mapping of the range and the offset in a multidimensional interpolation table stage of the transform-defining element and fitting output to input data scopes between two of the processing stage definitions, and the image comprising a parameterized encoding of the image color space with the image parameters defining the range and the offset of the image component of the image;
wherein the affecting comprises:
determining a first processing stage by making entries of the multidimensional interpolation table positive and normalizing the entries in the multidimensional interpolation table;
generating a second processing stage that denormalizes output of the first processing stage, applies a nonlinear function and scales by a scaling factor; and
generating a third processing stage that denormalizes output of the second processing stage and performs the chromatic adaptation.

48. An apparatus comprising:
means for receiving an image comprising a parameterized encoding of an image color space with image parameters defining a range and an offset of an image component of the image; and
means for taking image parameters into account across two or more processing stage definitions of a transform-defining element in a color profile associated with a defined image processing pipeline during generation of the color profile for the image, such that the color profile transcodes the image component according to the range and the offset, and the means for taking image parameters into account includes means for defining a mapping of the range and the offset in a multidimensional interpolation table stage of the transform-defining element and means for fitting output to input data scopes between one stage and a subsequent stage of the defined image processing pipeline to increase precision;
wherein the means for taking image parameters into account comprises:
means for making entries of the multidimensional interpolation table positive and normalizing the entries in the multidimensional interpolation table to determine a first processing stage;
means for generating a second processing stage that denormalizes output of the first processing stage, applies a nonlinear function and scales by a scaling factor; and
means for generating a third processing stage that denormalizes output of the second processing stage and performs the chromatic adaptation.

* * * * *